United States Patent [19]

Saitou et al.

[11] Patent Number: 5,109,967

[45] Date of Patent: May 5, 1992

[54] ELECTRONICALLY CONTROLLED CLUTCH ENGAGEMENT SPEED CORRECTING FOR AN AUTOMATIC TRANSMISSION SYSTEM

[75] Inventors: Yoshitami Saitou; Nobuyuki Isono; Nobuyasu Suzumura, all of Aichi, Japan

[73] Assignee: Aisin Seiki K.K., Aichi, Japan

[21] Appl. No.: 498,673

[22] Filed: Mar. 26, 1990

[30] Foreign Application Priority Data

Mar. 28, 1989 [JP] Japan .................................. 1-077685

[51] Int. Cl.$^5$ ............................................ F16D 23/00
[52] U.S. Cl. ............................. 192/0.076; 192/0.032; 74/862
[58] Field of Search ............. 192/0.032, 0.034, 0.075, 192/0.076, 103 C; 74/859, 862

[56] References Cited

U.S. PATENT DOCUMENTS

| | | | |
|---|---|---|---|
| 4,283,970 | 8/1981 | Vukovich | 74/862 |
| 4,507,985 | 3/1985 | Morimoto | 74/862 |
| 4,715,482 | 12/1987 | Watanabe et al. | 192/0.076 |
| 4,723,644 | 2/1988 | Sakakiyama | 192/0.076 |
| 4,795,011 | 1/1989 | Ushijima et al. | 192/0.032 |
| 4,880,094 | 11/1989 | Ohkumo | 192/0.076 |
| 4,905,801 | 3/1990 | Tezuka | 192/0.032 |

*Primary Examiner*—Allan D. Herrmann
*Assistant Examiner*—Ryan W. Massey
*Attorney, Agent, or Firm*—Sughrue, Mion, Zinn, Macpeak & Seas

[57] ABSTRACT

An electronically controlled automatic transmission system including an automatic transmission having a plurality of clutches and brakes activated by application of a fluid pressure to change the gear ratio by engagement and disengagement of the clutches and brakes, a fluid pressure switching device for controlling the application of the fluid pressure to the clutches and brakes, and an electronic controller for changing the engagement and disengagement of the clutches and brakes by driving the fluid pressure switching device in accordance with the running condition of the vehicle, the electronic controller also controlling the speed of engagement of a clutch or brake which is to be engaged. The electronic controller includes a torque sensor for detecting the torque of the output shaft of the automatic transmission, and an engagement speed correcting device for correcting the speed of engagement of a clutch or brake which is to be engaged on the basis of the detected torque. If the condition of double engagement is judged to be improper in the process of gear-shifting, the speed of engagement of the clutch or brake to be engaged is automatically corrected so that the condition of double engagement is shifted to an optimal one by feedback control. Thus, the shock applied to the vehicle during a gear-shifting operation is reduced.

8 Claims, 18 Drawing Sheets

(When △T2 is obtained during TSD1)

FIG. 14

| Turbine speed rpm | $\theta 0$, $\theta 1$ | $\theta 2$, $\theta 3$ | $\theta 4$, $\theta 5$ | $\theta 6$, $\theta 7$ | $\theta 8$, $\theta 9$ | $\theta 10$, $\theta 11$ | $\theta 12$, $\theta 13$ | $\theta 14$, $\theta 15$ |
|---|---|---|---|---|---|---|---|---|
| ~100 | 0.8 | 4.1 | 6.4 | 8.8 | 12.0 | 12.0 | 12.0 | 12.0 |
| ~200 | 0.8 | 4.0 | 6.1 | 8.7 | 11.6 | 11.6 | 11.6 | 11.6 |
| ~300 | 0.8 | 3.8 | 5.8 | 8.5 | 11.8 | 11.8 | 11.8 | 11.8 |
| ~400 | 0.8 | 3.5 | 5.6 | 8.3 | 11.4 | 11.4 | 11.4 | 11.4 |
| ~500 | 0.8 | 3.3 | 5.4 | 8.1 | 11.2 | 11.2 | 11.2 | 11.2 |
| ~600 | 0.8 | 3.1 | 5.2 | 7.9 | 11.0 | 11.0 | 11.0 | 11.0 |
| ~700 | 0.8 | 2.9 | 5.0 | 7.7 | 10.8 | 10.8 | 10.8 | 10.8 |
| ~800 | 0.8 | 2.7 | 4.8 | 7.5 | 10.6 | 10.6 | 10.6 | 10.6 |
| ~900 | 0.8 | 2.5 | 4.6 | 7.3 | 10.4 | 10.4 | 10.4 | 10.4 |
| ~1000 | 0.8 | 2.3 | 4.4 | 7.0 | 10.2 | 10.2 | 10.2 | 10.2 |
| ~1100 | 0.8 | 2.1 | 4.2 | 6.7 | 10.0 | 10.0 | 10.0 | 10.0 |
| ~1200 | 0.8 | 1.9 | 4.0 | 6.4 | 9.8 | 9.8 | 9.8 | 9.8 |
| ~1300 | 0.8 | 1.7 | 3.8 | 6.1 | 9.6 | 9.6 | 9.6 | 9.6 |
| ~1400 | 0.8 | 1.7 | 3.6 | 5.8 | 9.4 | 9.4 | 9.4 | 9.4 |
| ~1500 | 0.8 | 1.7 | 3.4 | 5.5 | 9.2 | 9.2 | 9.2 | 9.2 |
| ~1600 | 0.8 | 1.7 | 3.2 | 5.2 | 8.9 | 9.0 | 9.0 | 9.0 |
| ~1700 | 0.8 | 1.7 | 3.0 | 4.9 | 8.6 | 8.8 | 8.8 | 8.8 |
| ~1800 | 0.8 | 1.7 | 2.8 | 4.6 | 8.3 | 8.6 | 8.6 | 8.6 |
| ~1900 | 0.8 | 1.7 | 2.6 | 4.3 | 8.0 | 8.4 | 8.4 | 8.4 |
| ~2000 | 0.8 | 1.7 | 2.4 | 4.0 | 7.7 | 8.2 | 8.2 | 8.2 |
| ~2100 | 0.8 | 1.7 | 2.4 | 3.8 | 7.4 | 8.0 | 8.0 | 8.0 |
| ~2200 | 0.8 | 1.7 | 2.4 | 3.6 | 7.1 | 7.8 | 7.8 | 7.8 |
| ~2300 | 0.8 | 1.7 | 2.4 | 3.4 | 6.8 | 7.6 | 7.6 | 7.6 |
| ~2400 | 0.8 | 1.7 | 2.4 | 3.2 | 6.5 | 7.4 | 7.4 | 7.4 |
| ~2500 | 0.8 | 1.7 | 2.4 | 3.0 | 6.2 | 7.2 | 7.2 | 7.2 |
| ~2600 | 0.8 | 1.7 | 2.4 | 2.8 | 5.9 | 7.0 | 7.0 | 7.0 |
| ~2700 | 0.8 | 1.7 | 2.4 | 2.6 | 5.6 | 6.8 | 6.8 | 6.8 |
| ~2800 | 0.8 | 1.7 | 2.4 | 2.4 | 5.3 | 6.6 | 6.6 | 6.6 |
| ~2900 | 0.8 | 1.7 | 2.4 | 2.2 | 5.0 | 6.4 | 6.4 | 6.4 |
| ~3000 | 0.8 | 1.7 | 2.4 | 2.0 | 4.7 | 6.2 | 6.2 | 6.2 |
| ~3100 | 0.8 | 1.7 | 2.4 | 2.0 | 4.4 | 6.0 | 6.0 | 6.0 |
| ~3200 | 0.8 | 1.7 | 2.4 | 2.0 | 4.1 | 5.8 | 5.8 | 5.8 |
| ... | ... | ... | ... | ... | ... | ... | ... | ... |

Unit: $kg/cm^2$

ELECTRONICALLY CONTROLLED CLUTCH ENGAGEMENT SPEED CORRECTING FOR AN AUTOMATIC TRANSMISSION SYSTEM

BACKGROUND OF THE INVENTION

1. Field of the Invention

The present invention relates to an electronically controlled automatic transmission system mounted on a vehicle.

2. Description of the Related Art

In a typical conventional automatic transmission system, clutches and brakes provided in the automatic transmission are activated by changing the level of oil pressure in an oil-hydraulic circuit to shift gears. To effect gear-shifting, a clutch or brake which has been engaged is released and a desired clutch or brake is engaged instead. Accordingly, a temporary neutral state may occur during a gear-shifting operation. If such a temporary neutral state occurs during acceleration of the vehicle, it is likely that the engine speed will suddenly increase or the torque which has been transmitted will suddenly be cut off, thus causing a shock to the vehicle. To reduce this shock, there has been proposed a method wherein, before a clutch or brake which is to be released is completely released, a clutch or brake which is to be engaged is gradually engaged.

This conventional method causes temporary double engagement in the course of a gear-shifting operation. If the double engagement is heavy, a shock is generated, whereas, if the double engagement is light, the transmitted torque is suddenly cut off, thus causing a shock to the vehicle, as stated above. The condition of double engagement is affected by variations in the oil pressure and mechanical errors. It is therefore impossible with the prior art method to completely eliminate the fear of a shock occurring during a gear-shifting operation.

SUMMARY OF THE INVENTION

It is a primary object of the present invention to provide an electronically controlled automatic transmission system wherein the condition of double engagement is effectively corrected so as to minimize the probability that a shock to the vehicle will occur during a gear-shifting operation.

To this end, the present invention provides an electronically controlled automatic transmission system which comprises a torque detecting means for detecting the torque of the output shaft of the automatic transmission and an engagement speed correcting means for correcting the speed of engagement of a clutch or brake which is to be engaged on the basis of the detected torque.

When the condition of double engagement is improper, the torque of the output shaft of the automatic transmission changes. The speed of engagement of a clutch or brake which is to be engaged is therefore corrected in accordance with the torque change. Thus, the condition of double engagement can be shifted to an optimal one by feedback control.

It should be noted that, when the torque of the output shaft of the automatic transmission changes, a shock acts on the automatic transmission or the vehicle. Accordingly, it is possible to estimate a change in the torque of the output shaft of the automatic transmission by measuring the acceleration acting on the automatic transmission or the vehicle by an acceleration detecting means. In this case, there is no need for a torque sensor for measuring the torque of the output shaft of the automatic transmission. The mounting position of an acceleration sensor which serves as the acceleration detecting means is not particularly restricted. Accordingly, the acceleration sensor may be mounted in a vacant space, whereas the torque sensor must be mounted on the output shaft of the automatic transmission. The present invention can therefore be carried out without any change in the overall size of the automatic transmission system.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIGS. 14 and 15 are charts employed to explain line pressure control.

DESCRIPTION OF THE PREFERRED EMBODIMENT

One embodiment of the present invention will be described below with reference to the accompanying drawings. In this embodiment, a four-speed (overdrive) automatic transmission is used as the main body of the automatic transmission system.

Figure 1:
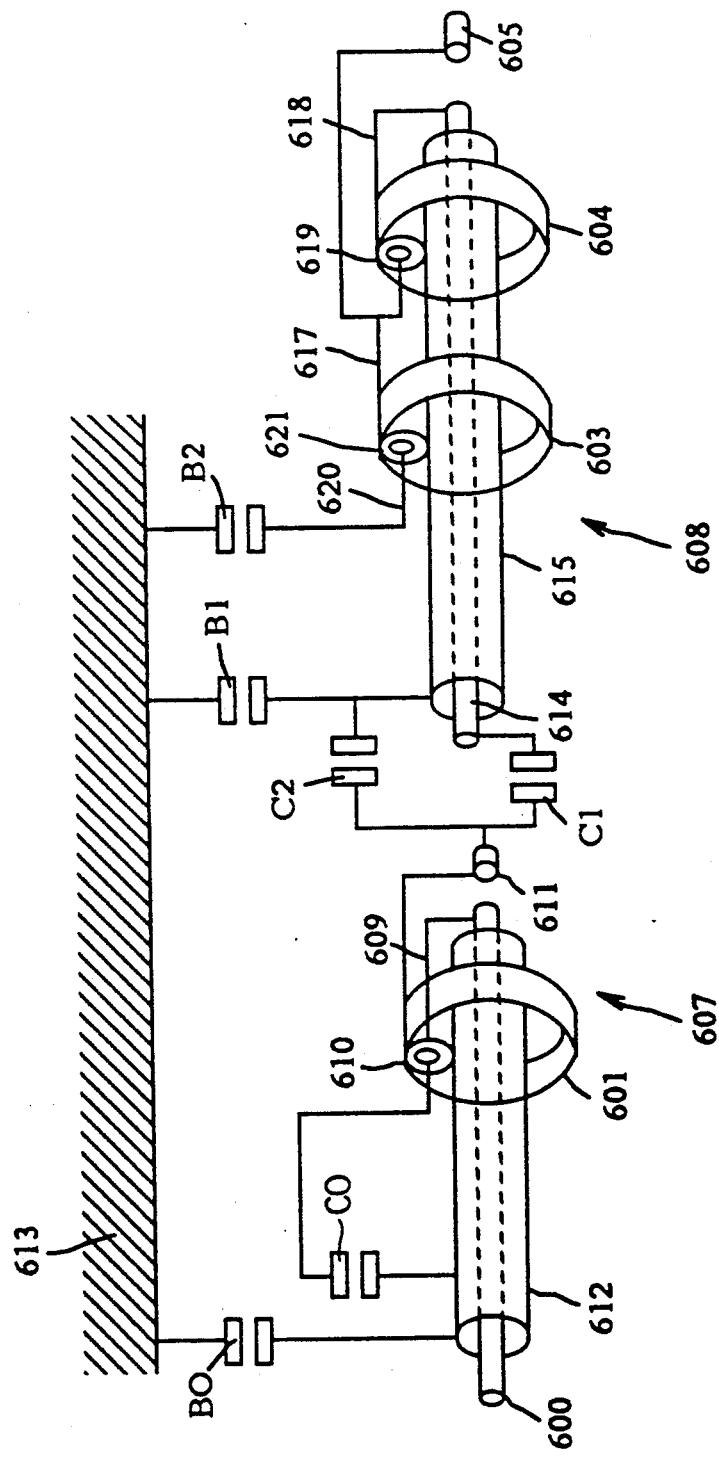
FIG. 1 shows an automatic transmission in one embodiment of the electronically controlled automatic transmission system according to the present invention.

The operation of the automatic transmission will first be explained with reference to FIG. 1. A turbine shaft 600 which is defined as an input shaft of an overdrive mechanism 607 is coupled to an engine through a torque converter. The turbine shaft 600 is coupled to a carrier 609 constituting a planetary gear train. A planetary pinion 610 which is rotatably supported by the carrier 609 is coupled to an input shaft 611 of a gear transmission mechanism 608 through an OD planetary gear 601. The planetary pinion 610 is also meshed with a sun gear 612. Between the sun gear 612 and a housing 613 is provided an OD brake B0. A forward clutch C1 is provided between the input shaft 611 and intermediate shaft 614 of the gear transmission mechanism 608. A direct clutch C2 is provided between the input shaft 611 and sun gear shaft 615 of the gear transmission mechanism 608. A second brake B1 is provided between the sun gear shaft 615 and the housing 613. A planetary pinion 619 is rotatably supported by a carrier 617 coupled to an output shaft 605 and it is coupled to the intermediate shaft 614 through a gear and a carrier 618. The planetary pinion 619 is also meshed with the sun gear shaft 615. A planetary pinion 621 is meshed with both the carrier 617 and the sun gear shaft 615. Between the planetary pinion 621 and the housing 613 is provided a 1st and Rev brake B2.

Table 1 below shows the relationship between the combinations of the clutches C0, C1, C2 and the brakes B0, B1, B2 and the gear positions in this automatic transmission.

TABLE 1

| | Conditions of clutches and brakes | | | | | |
|---|---|---|---|---|---|---|
| | C0 | C1 | C2 | B0 | B1 | B2 |
| R | O | X | O | X | X | X |
| P,N | O | X | X | X | X | X |
| O/D | X | O | O | O | X | X |
| 3rd | O | O | O | X | X | X |
| 2nd | O | O | X | X | O | X |
| 1st | O | O | X | X | X | O |

O: engaged  X: disengaged

Figure 2:
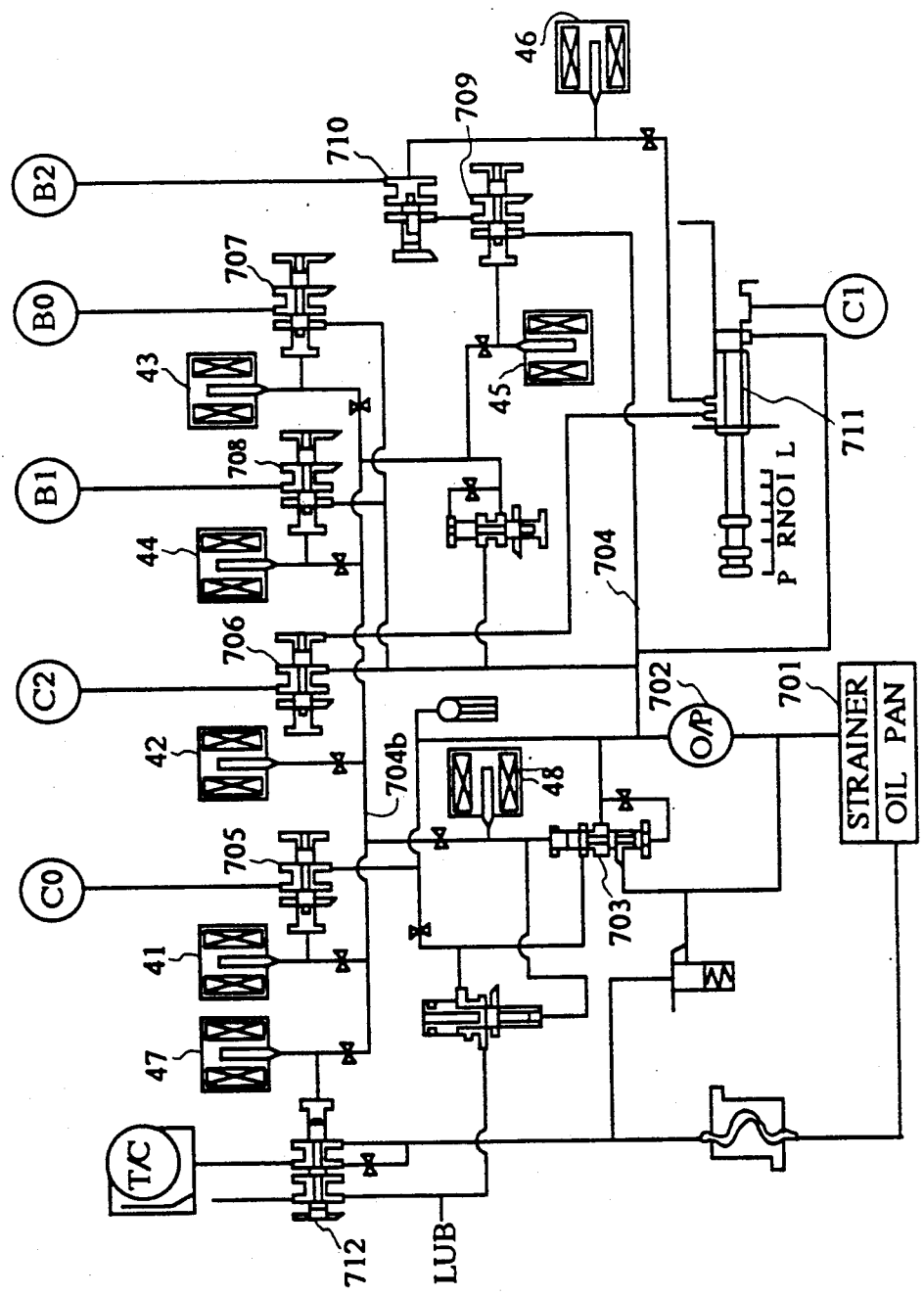
FIG. 2 shows an oil-hydraulic circuit for driving the automatic transmission shown in FIG. 1.

Engagement and release of the clutches C0, C1, C2 and the brakes B0, B1, B2 are controlled by an oil-hydraulic circuit shown in FIG. 2.

Referring to FIG. 2, hydraulic oil that is pumped up from an oil reservoir 701 by an oil-hydraulic pump 702 is supplied to a line pressure oil passage 704. The oil pressure in the line pressure oil passage 704 is regulated by a pressure regulating valve 703 which is controlled by a solenoid valve 48 for line pressure control. A line pressure oil passage 704b is connected to the line pressure oil passage 704 through the pressure regulating valve 703 and it is also connected to manual valves 705, 706, 707, 708 and 709 through a solenoid valve 41 for controlling the clutch C0, a solenoid valve 42 for controlling the clutch C2, a solenoid valve 43 for controlling the brake B0, a solenoid valve 44 for controlling the brake B1 and a solenoid valve 45 for controlling the brake B2, respectively. To the manual valves 705, 706, 707, 708 and 709 is directly connected the output of the oil-hydraulic pump 702. The respective outputs of the manual valves 705, 706, 707 and 708 are connected to the clutch C0, clutch C2, brake B0 and brake B1. The output of the manual valve 709 is connected to the brake B2 through a valve 710. The valve 710 is connected to a shift valve 711 through a low, reverse inhibit solenoid valve 46. The shift valve 711 is also connected to the manual valve 706. The shift valve 711 moves in response to the operation of a shift lever so that the oil pressure supplied from the oil-hydraulic pump 702 is applied to the inside of the shift valve 711 when any range other than the P (parking) range is selected. When the 1st, 2nd, 3rd or OD range is selected, the shift valve 711 operates so that the oil pressure is applied to the clutch C1. When the L (low) or 2 (second) range is selected, the shift valve 711 supplies the oil pressure to the manual valve 706, whereas, when the L (low) or R (reverse) range is selected, the shift valve 711 supplies the oil pressure to the low, reverse inhibit solenoid valve 46.

By virtue of the above-described arrangement, when the solenoid valve 41 for controlling the clutch C0 is opened, the valve body of the manual valve 705 moves so that the output from the oil-hydraulic pump 702 is applied to the clutch C0. Thus, the clutch C0 is engaged. When the solenoid valve 41 is closed, no oil pressure is applied to the clutch C0, which is thus released.

When the 1st, 2nd, 3rd or OD range is selected, oil pressure is applied to the clutch C1, whereas, any other range is selected, no oil pressure is applied to the clutch C1 and it is therefore released.

As to the clutch C2, when the solenoid valve 42 for controlling the clutch C2 is opened, the valve body of the manual valve 706 moves so that oil pressure is applied to the clutch C2, which is thus engaged. When the solenoid valve 42 is closed, no oil pressure is applied to the clutch C2, which is thus released. When the L (low) or 2 (second) range is selected, however, oil pressure is supplied to the manual valve 706 through the shift valve 711 so that the oil pressure supplied to the clutch C2 is cut off irrespective of the action of the solenoid valve 42 for controlling the clutch C2.

As to the brake B0, when the solenoid valve 43 for controlling the brake B0 is opened, the valve body of the manual valve 707 moves so that no oil pressure is applied to the brake B0, which is thus released. When the solenoid valve 43 is closed, oil pressure is applied to the brake B0, which is thus engaged.

As to the brake B1, when the solenoid valve 44 for controlling the brake B1 is opened, the valve body of the manual valve 708 moves so that no oil pressure is applied to the brake B1, which is thus released. When the solenoid valve 44 is closed, oil pressure is applied to the brake B1, which is thus engaged.

As to the brake B2, when the solenoid valve 45 for controlling the brake B2 is opened, the valve body of the manual valve 709 moves so that no oil pressure is applied to the brake B2, which is thus released. When the solenoid valve 45 is closed, oil pressure is applied to the brake B2 through the valve 710, the brake B2 thus being engaged. However, if the low, reverse inhibit solenoid valve 46 is turned on in R (reverse) and L (low) range, oil pressure is applied to the valve 710 so as to cut off the supply of oil pressure to the brake B2, which is thus released.

In the arrangement shown in FIG. 2, the reference numeral 712 denotes a lock-up control valve which is arranged such that, when a lock-up control solenoid valve 47 is turned on, the engine output shaft and the turbine shaft 600 are directly coupled together to enter into a lock-up state.

The above-described solenoid valves are driven by an electronic control circuit (described later) to control the clutches and brakes so as to be engaged or disengaged in accordance with the running conditions, as shown in Table 1. Each solenoid valve repeats on/off at a relatively high frequency under control of the electronic control circuit (described later). Thus, by controlling the duty ratio of each solenoid valve, the opening of the valve member of the associated manual valve can be controlled. As the duty ratio is raised, the manual valve opens to a larger extent, so that the oil pressure produced by the oil-hydraulic pump 702 is applied to the associated clutch or brake at higher speed. In consequence, the operating speed of the clutch or brake increases. As the duty ratio is lowered, the opening of the manual valve decreases, so that the oil pressure produced by the oil-hydraulic pump 702 takes a longer time to reach the associated clutch or brake. Consequently, the operating speed of the clutch or brake lowers. Thus, by controlling the duty ratio, the operating speed of each clutch of brake can be controlled and it is therefore possible to reduce the shock generated when the clutch or brake is engaged and also possible to improve the transmission efficiency.

Figure 3:
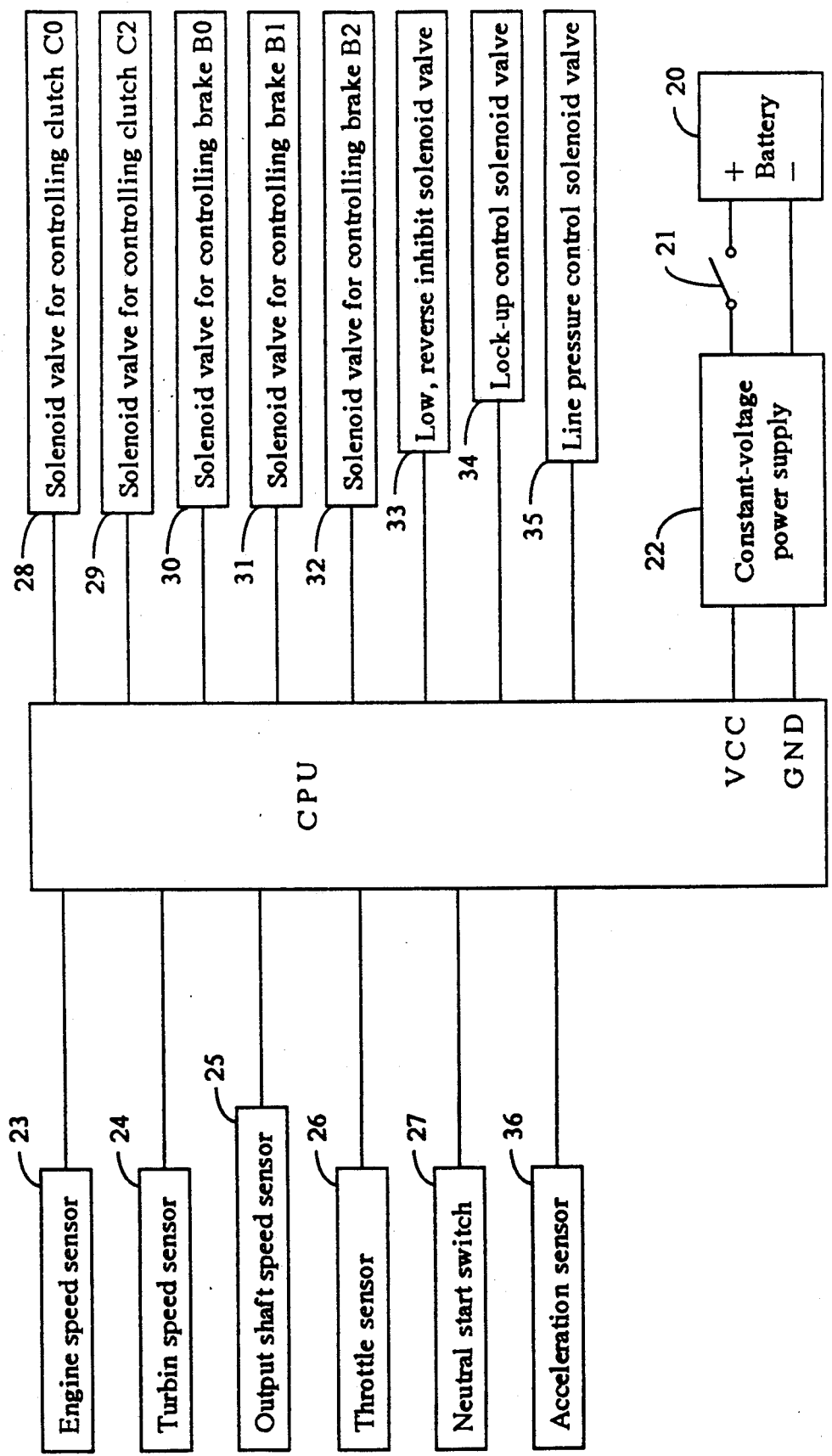
FIG. 3 shows an electronic control circuit for controlling the oil-hydraulic circuit shown in FIG. 2.

FIG. 3 shows an electronic control circuit that drives the solenoid valves provided in the oil-hydraulic circuit.

The input end of a constant-voltage power supply 22 is connected through an ignition switch 21 to the terminals of a battery 20 which is mounted on the vehicle. To the output end of the constant-voltage power supply 22 are connected power supply terminals VCC and GND of a central processing unit CPU. The constant-voltage power supply 22 converts the output voltage of the battery 20 into a voltage at which the central processing unit CPU can operate.

To the input terminals of the central processing unit CPU are respectively connected an engine speed sensor 23, a turbine speed sensor 24, an output shaft speed sensor 25, a throttle sensor 26, a neutral start switch 27 and an acceleration sensor 36. For simplification, illustration of input interfaces of the above-described sensors and switch is omitted in FIG. 3.

The engine speed sensor 23 detects the rotational speed of the engine mounted on the vehicle. The engine speed sensor 23 is disposed in the vicinity of the output shaft of the engine to output a pulse signal having a frequency corresponding to the engine speed, that is, the number of revolutions of the engine output shaft. In this embodiment, the engine speed sensor 23 is an electromagnetic pick-up type sensor which is installed in opposing relation to the teeth of a ring gear secured to the output shaft of the engine. The engine speed sensor 23 outputs 120 pulses per revolution of the ring gear. The output of the sensor 23 is sent to the central processing unit CPU.

The turbine speed sensor 24 detects the rotational speed of the turbine, that is, the number of revolutions of the turbine shaft. The turbine speed sensor 24 is disposed in the vicinity of the turbine rotating shaft to output a pulse signal having a frequency corresponding to the rotational speed of the turbine. In this embodiment, the turbine speed sensor 24 is an electromagnetic pick-up type sensor which is installed in opposing relation to the teeth of a gear which is secured to the turbine shaft 600. The turbine speed sensor 24 outputs 57 pulses per revolution of the gear. The output of the sensor 24 is sent to the central processing unit CPU.

The output shaft speed sensor 25 detects the rotational speed, that is, the number of revolutions, of the output shaft of the automatic transmission. The output shaft speed sensor 25 is disposed in the vicinity of the output shaft of the automatic transmission to output a pulse signal having a frequency corresponding to the rotational speed of the output shaft of the automatic transmission. In this embodiment, the output shaft speed sensor 25 is an electromagnetic pick-up type sensor which is installed in opposing relation to the teeth of a gear which is secured to the output shaft of the automatic transmission. The output shaft speed sensor 25 outputs 18 pulses per revolution of the gear. The output of the sensor 25 is sent to the central processing unit CPU. It should be noted that the output shaft speed sensor 25 may be replaced by a different kind of sensor which detects the speed of the vehicle if the relationship between the output shaft of the automatic transmission and the number of revolutions of the wheels.

The throttle sensor 26 detects the opening of the throttle valve of the engine. Throttle sensors include two different types, that is, digital, mechanical type throttle sensors wherein the angle of rotation of the throttle valve is detected by means of a switch to determine the opening of the throttle valve, and analog, electrical throttle sensors wherein the angle of rotation of the throttle valve is converted into a voltage value and the opening of the throttle valve is determined by use of an A/D converter. In the present invention, these two different types of throttle sensors are provided and used while being changed over from one to the other. In an ordinary transmission system, however, provision of either of the throttle sensors will suffice. The throttle sensor 26 outputs through four signal lines a signal representing information concerning the opening of the throttle valve which is divided by 16. The full-closed position is expressed by $\theta 0$, and the full-open position by $\theta 15$. The fourteen valve positions in between 80 and $\theta 15$ are expressed by $\theta 1$ to $\theta 14$, respectively.

The neutral start switch 27 detects the position of the shift lever. The neutral start switch 27 has a D (drive) range switch, an L (low) range switch, a 2 (second) range switch, 3 (third) range switch, an N (neutral) range switch, an R (reverse) range switch and a P (parking) range switch to detect the D, L, 2, 3, N, R and P ranges.

The acceleration sensor 36 is mounted on either the automatic transmission or the vehicle to measure the degree of acceleration acting on the automatic transmission. The acceleration sensor 36 may be mounted at any desired position, provided that it is possible to satisfactorily exclude by use of a band-pass filter or the like the influence of the acceleration acting on the vehicle when accelerated or decelerated, vertical vibrations of the vehicle on a rough road, engine vibrations or the transverse acceleration acting on the vehicle when taking a curve. It is, however, preferable to mount the acceleration sensor 36 directly on the automatic transmission since it is installed for the purpose of detecting the torque of the output shaft of the automatic transmission.

To the output terminals of the central processing unit CPU are respectively connected a solenoid valve 28 for controlling the clutch C0, a solenoid valve 29 for controlling the clutch C2, a solenoid valve 30 for controlling the brake B0, a solenoid valve 31 for controlling the brake B1, a solenoid valve 32 for controlling the brake B2, a low, reverse inhibit solenoid valve 33, a lock-up control solenoid valve 34 and a line pressure control solenoid valve 35. For simplification, illustration of the output interfaces or drive units of the above-described solenoid valves is omitted in FIG. 3.

Each solenoid valve is controlled by the central processing unit CPU.

The central processing unit CPU incorporates memories such as RAM and ROM, timers and registers. When the ignition switch is turned on to start supply of a voltage to the central processing unit CPU, it starts to execute the main routine shown in FIG. 4.

Figure 4:
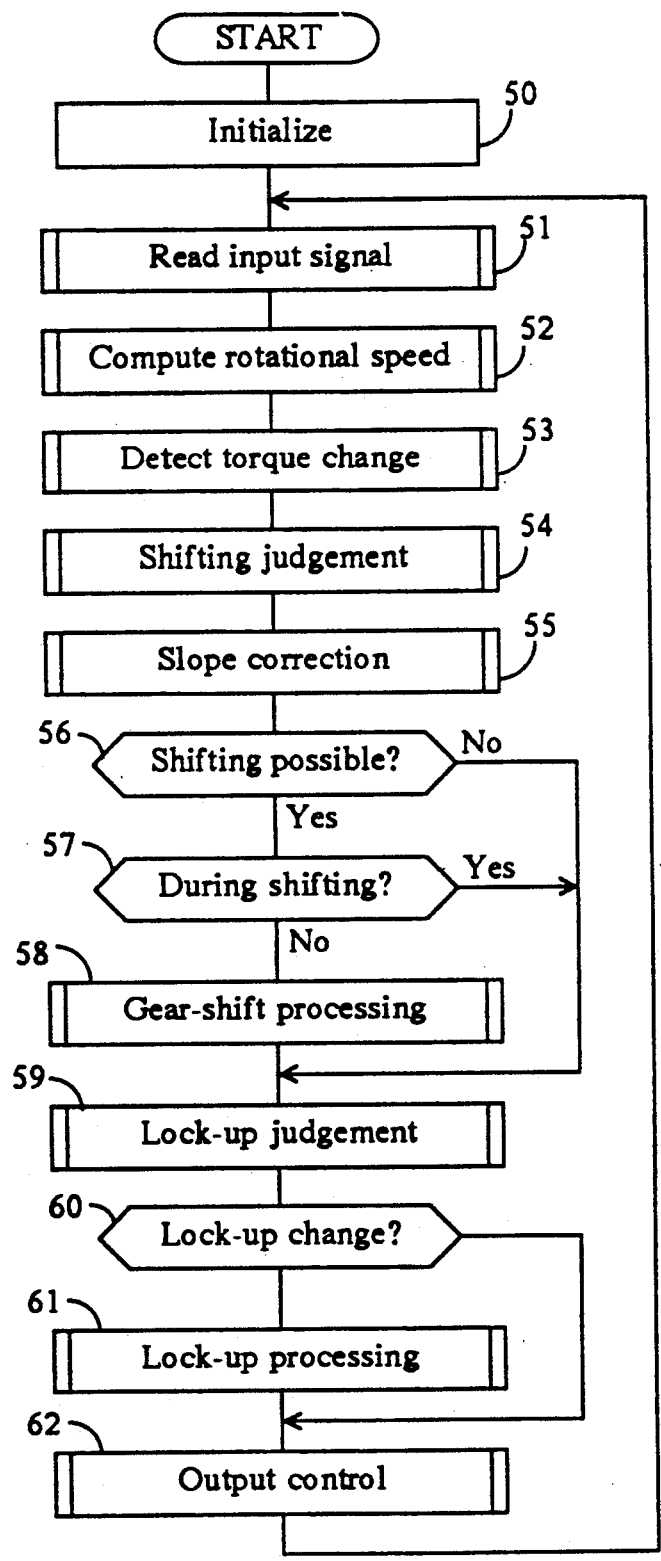
FIG. 4 is a flowchart showing the main routine of the CPU in the electronic control circuit shown in FIG. 3.

FIG. 4 is a flowchart showing the main routine, vehicle speed sensor interrupt, turbine speed sensor interrupt, engine speed sensor interrupt and fixed time interrupt of the central processing unit CPU.

[Main Routine]

As the central processing unit CPU starts, the following processings are executed (Step 50), that is, setting of the input/output direction of each input/output port, initialization of each memory, setting of data indicative of whether or not there is an interruption, and so forth. Thereafter, an input signal read routine is executed (Step 51). More specifically, the state of each of the sensors and switch connected to the input terminals of the central processing unit CPU is read, removal of noise is effected, and data is set in accordance with the state of each sensor or switch. In this routine, the output value of the acceleration sensor 36 is substituted into the variable TQ as being the value of a change in the torque of the output shaft of the automatic transmission. It should be noted that, when a torque sensor which directly detects the torque of the output shaft of the automatic transmission is employed in place of the acceleration sensor, the torque measured thereby is substituted into the variable TQ.

Next, a rotational speed computing routine is executed to compute a vehicle speed, a turbine speed, i.e., a number of revolutions of the turbine shaft, and an engine speed, i.e., a number of revolutions of the engine output shaft (Step 52).

The engine speed NE is computed according to the following equations. It should be noted that, since the output from the engine speed sensor has a high frequency, the frequency of the output is divided by eight before it is subjected to computation.

$$NE = [nE (i-1) + nEi]/2$$
$$nEi = (PCEi/TEi) \times (\text{divided-by-8 frequency}/8 \times 10^{-6}) \times (60/120)$$

where
- $nEi$: the engine speed based on the present pulse
- $TEi$: the time interval between the preceding pulse and the leading edge of the first pulse appearing after 10 ms has elapsed after the preceding pulse
- $PCEi$: the number of pulses during $TEi$
- $8 \times 10^{-6}$: the minimum unit (8 μs) of detecting time The turbine speed NT is computed according to the following equations. It should be noted that, since the output from the turbine speed sensor has a high frequency, the frequency of the output is divided by four before it is subjected to computation.

$$NT = [nT (i-1) + nTi]/2$$
$$nTi = (PCTi/TTi) \times (\text{divided-by-4 frequency}/8 \times 10^{-6}) \times (60/57)$$

where
- $nTi$: the turbine speed based on the present pulse
- $TTi$: the time interval between the preceding pulse and the leading edge of the first pulse appearing after 10 ms has elapsed after the preceding pulse
- $PCTi$: the number of pulses during $TTi$ The output shaft speed NO, that is, the number of revolutions of the output shaft of the automatic transmission, is computed according to the following equations:

$$NO = [nO (i-1) + nOi]/2$$
$$nOi = (PCOi/TOi) \times (1/8 \times 10^{-6}) \times (60/18)$$

where
- $nOi$: the output shaft speed based on the present pulse
- $TOi$: the time interval between the preceding pulse and the leading edge of the first pulse appearing after 10 ms has elapsed after the preceding pulse
- $PCOi$: the number of pulses during $TOi$ Since the gear ratio of the output shaft to the axle and the radius of each wheel can be obtained in advance, the vehicle speed can be obtained from the output shaft speed NO.

Next, a torque change detecting routine is executed to judge whether or not there is a change in the torque (Step 53).

Next, a gear-shifting judging routine is executed to judge whether or not gear-shifting should be effected (Step 54). In the gear-shifting judging routine, setting of a line pressure is also carried out. A line pressure set value is determined on the basis of the throttle opening and the turbine speed. The line pressure solenoid is duty-controlled in accordance with this set value. In this routine, whether or not gear-shifting should be effected is judged on the basis of a previously prepared gear-shifting chart from the throttle opening, the vehicle speed and the present gear position.

Next, a slope correcting routine is executed to make slope correction (Step 55). In this routine, a processing for changing the engagement speed of a solenoid valve for controlling a clutch or brake which is to be engaged is carried out.

Upon completion of the above-described processing, if gear-shifting is approved in the gear-shifting judging routine and gear-shifting is not presently effected, a gear-shifting routine is executed to effect a gear-shift processing (Steps 56 to 58). This is a processing carried out at the time of starting gear-shifting to set a solenoid valve for controlling a clutch or brake which is to be released and a solenoid valve for controlling a clutch or brake which is to be engaged.

Next, a lock-up judging routine is executed, and if it is judged that the lock-up state should be changed, a lock-up processing routine is executed to effect processing for lock-up (Steps 59 to 61).

Finally, an output control routine is executed to effect output control (Step 62). In the output control, the following processings, which are executed at the time of starting gear-shifting, are carried out: selection of power-on up-shift, power-off up-shift or down-shift, determination of a gear-shifting condition during a gear-shifting operation and transmission of signals to the solenoid valves concerned. It should be noted that power-on up-shift is an up-shift operation which is carried out when the engine driving torque is relatively high, whereas, power-off up-shift is an up-shift operation carried out when the engine driving torque is relatively low. Since the condition of the engine driving torque greatly affects the change in the torque of the output shaft of the automatic transmission, the control time is changed in accordance with the condition of the engine driving torque to thereby reduce the shock acting on the vehicle during a gear-shifting operation.

[Interrupt Routines]

The output terminals of the output shaft speed sensor, the turbine speed sensor and the engine speed sensor are connected to the respective interrupt input terminals of the central processing unit CPU. Every time the voltage level at any of the interrupt terminals changes, the corresponding one of the following interrupt routines (not shown) is executed: an output shaft speed sensor interrupt routine, a turbine speed sensor interrupt routine, and an engine speed sensor interrupt routine. In the output shaft speed sensor interrupt routine, the time at which the interrupt occurs is first read off from the timer and then an operation flag for computing the number of revolutions of the output shaft is set (ON). Accordingly, the number of revolutions of the output shaft can be computed by referring to the time read when the operation flag is on in the main routine or a subroutine. In the turbine speed sensor interrupt routine, the time at which the interrupt occurs is first read off from the timer and then an operation flag for computing the number of revolutions of the turbine shaft is set (ON) when four consecutive interrupt signals are counted, in order to divide the frequency of input pulses by 4. In the engine speed sensor interrupt routine, the time at which the interrupt occurs is first read off from the timer and then an operation flag for computing the number of revolutions of the engine output shaft is set (ON) when eight consecutive interrupt signals are counted, in order to divide the frequency of input pulses by 8. The number of revolutions of the turbine shaft and that of the engine output shaft are computed in the same way as in the case of the number of revolutions of the output shaft.

Figure 5:
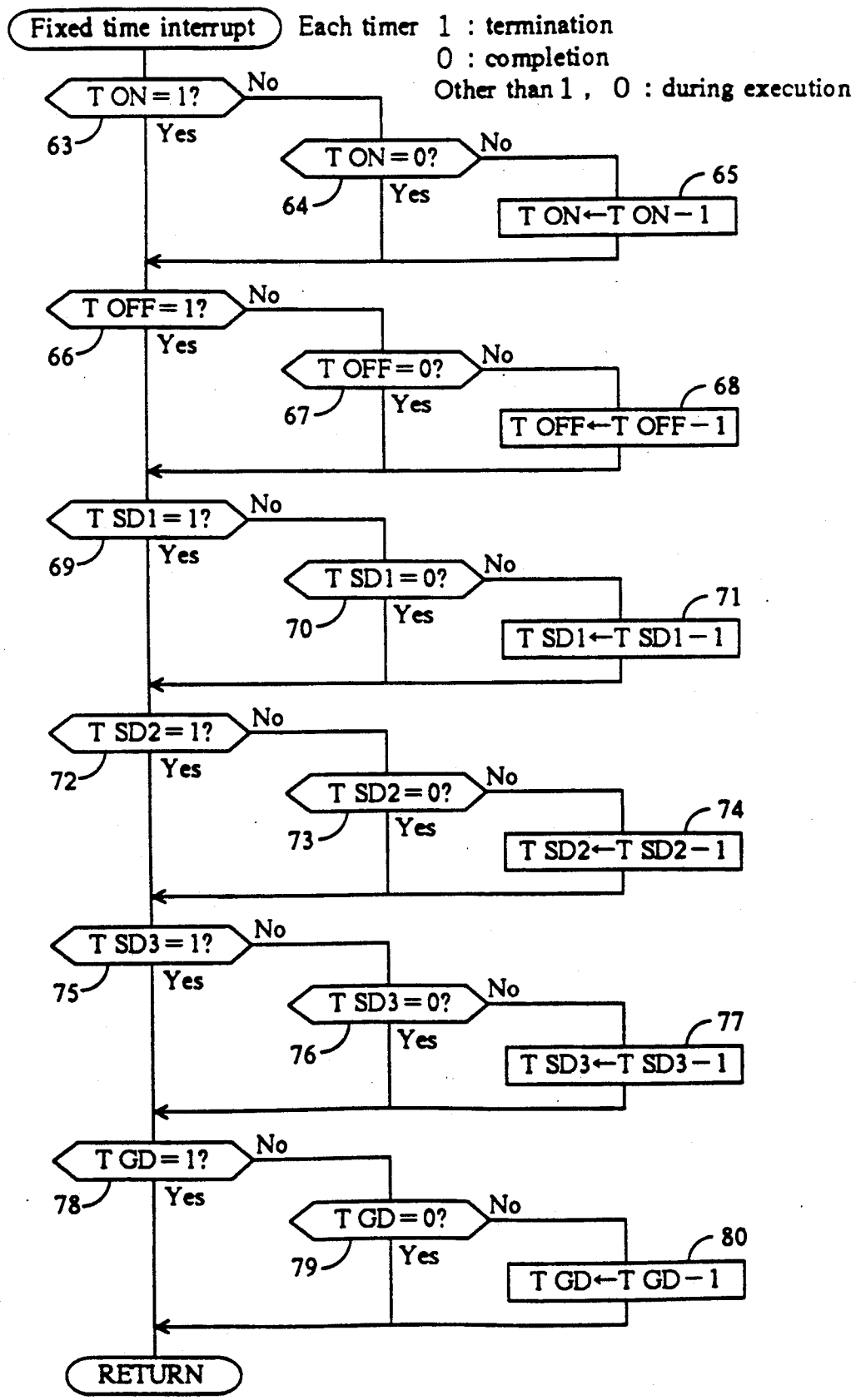
FIG. 5 is a flowchart showing a fixed time interrupt routine of the CPU in the electronic control circuit shown in FIG. 3.

The central processing unit CPU involves a fixed time interrupt which occurs every time a predetermined period of time has elapsed, such as that shown in FIG. 5. In this embodiment, the fixed time interrupt routine is executed once every 4ms. In this routine, subtraction is first carried out with respect to various timers which are used for control. Timers which are subjected to subtraction are a timer TON indicative of the time of starting engagement of a solenoid valve for controlling a clutch or brake which is to be engaged and five timers TOFF, TGD, TSD1, TSD2 and TSD3 for the releasing operation of a solenoid valve for controlling a clutch or brake which is to be released. In each timer, when a value of 1 or more is set therein during execution of the main routine or a subroutine, 1 is subtracted from the set value every time the fixed time interrupt routine is executed. However, when the value is 1, the timer holds it. Accordingly, when a time corresponding to a value initially set in each timer has elapsed, the timer value is 1. Thus, it is known that the timer has terminated. Each timer, when 0 is set therein during execution of the main routine or a subroutine, holds 0 even when an interrupt is initiated. In each timer, 0 is set after it has been confirmed that the timer value has become 1 in the main routine or a subroutine, as described later. Accordingly, the operating condition of each timer is known from the value of the timer: if the timer value is 2 or more, the counting operation is being executed; if it is 1, the counting operation has terminated; if it is 0, the counting operation has already been completed.

It should be noted that judgement as to whether or not the vehicle has stopped is made in this fixed time interrupt. In this embodiment, a state of the vehicle in which the vehicle speed is not higher than the vehicle stop speed Nstop=144rpm (about 3km/h) is defined as the stop of the vehicle. In addition, when there is no pulse for, at least, a period of time corresponding to the input frequency Tstop of pulses inputted to the central processing unit CPU, i.e., Tstop=23.13ms, the vehicle is judged to be stopped.

The details of each control will be explained below with reference to the flowchart.

[Torque Change Detecting Routine]

Figure 6:
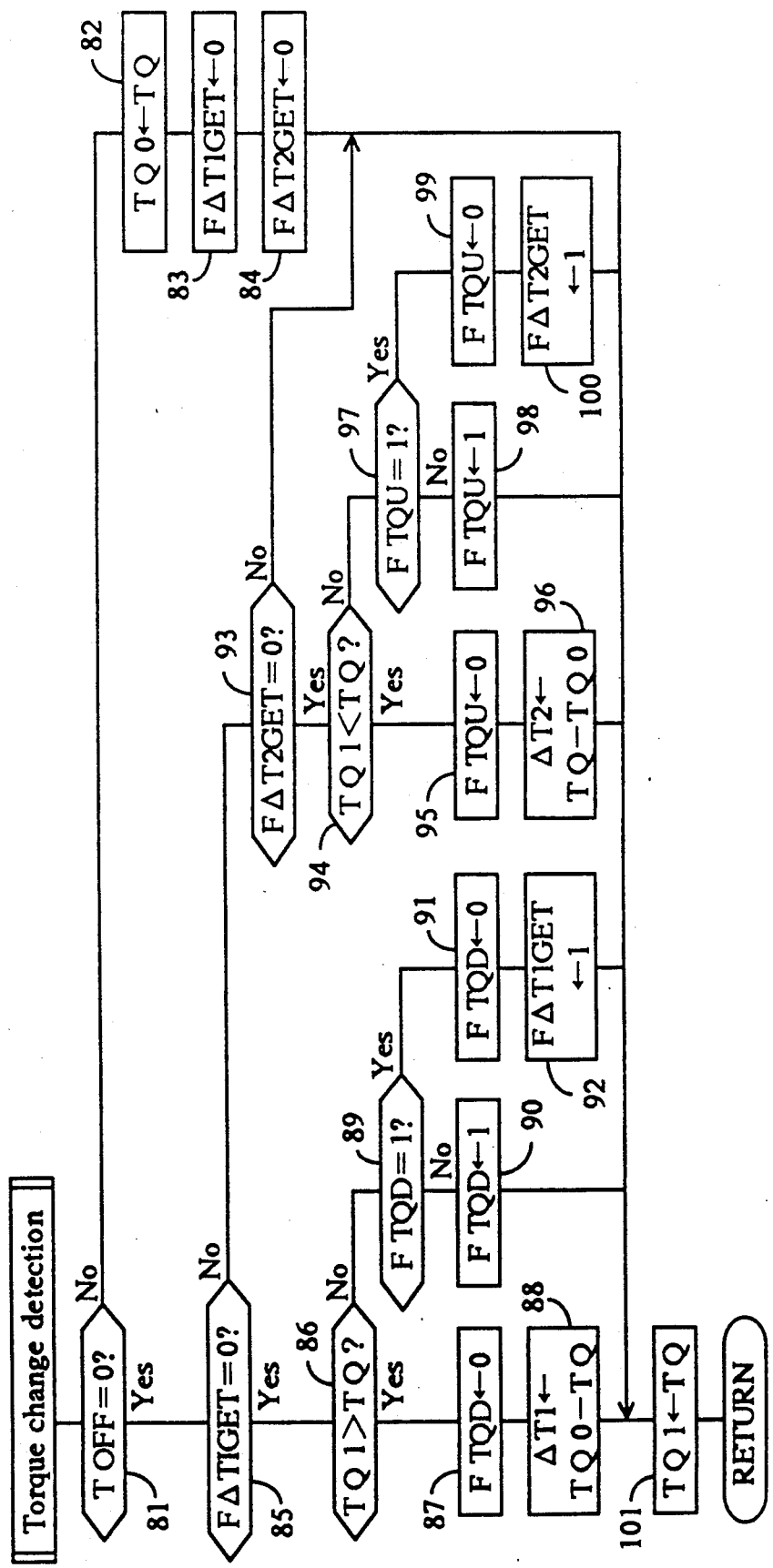
FIGS. 6, 7, 8 and 9 are flowcharts respectively showing in detail the torque change detecting routine, gear-shifting judging routine, slope correcting routine and output control routine shown FIG. 4.

FIG. 6 is a flowchart showing the torque change detecting routine.

In this routine, the variable TQ immediately before completion of the counting operation of the timer TOFF is first set in the memory TQ0 (Steps 81 and 82). As long as the value of the timer TOFF is not 0, the variable TQ is always set in the memory TQ0 when the torque change detecting routine is executed; therefore, after the timer TOFF has reached 0, the memory TQ0 is stored with the value of the variable TQ at the point of time when the timer TOFF reached 0. When the timer TOFF reaches 0, it is detected whether there has been a fall or rise in the torque, and it is measured if any. As long as the value of the timer TOFF is not 0, flags FΔT1GET and FΔT2GET are cleared (i.e., 0 is substituted: hereinafter, each flag is assumed to be set when 1 is substituted, and cleared when 0 is substituted) (Steps 83 and 84). Accordingly, immediately after the timer TOFF has reached 0, Step 86 and Steps which are subsequent thereto are executed. Since the variable TQ is stored into the memory TQ1 at the end (Step 101) of the torque change detecting routine, the value of the memory TQ1 is equal to the value of the variable TQ in the previous execution of this routine. When the variable TQ is continuously decreasing with time, the flag FTQD is cleared (Step 87), and the difference between the value TQ0 of the variable TQ at the point of time when the timer TOFF reached 0 and the present value of the variable TQ is substituted into the variable ΔT1 (Step 88). When the trend of the variable TQ shifts from descent to ascent, the flag FTQD is set (Step 90). When two consecutive rises in the variable TQ are detected, the flag FTQD is cleared (Step 91), and the flag FΔT1GET is set (Step 92). The flag FΔT1GET is not set unless two consecutive rises in the variable TQ are detected. In other words, the flag FTQD constitutes a simple noise filter. Thus, when the flag FΔT1GET is set, the maximum value among the falls in the variable TQ since the termination of the timer TOFF is substituted into the variable ΔT1.

Similarly, the rise in the torque is measured. When a fall in the torque is detected, the flag FΔT1GET is set; therefore, in the subsequent execution of this routine Step 93 and Steps which are subsequent thereto are executed. At this time, the flag FΔT2GET is still left cleared. When the variable TQ is continuously rising, the flag FTQU is cleared (Step 95), and the difference between the present value of the variable TQ and the value TQ0 of the variable TQ at the point of time when the timer TOFF reached 0 is substituted into the variable ΔT2 (Step 96). When the trend of the variable TQ shifts from ascent to descent, the flag FTQU is set (Step 98). When two consecutive falls in the variable TQ are detected, the flag FTQU is cleared (Step 99), and the flag FΔT2GET is set (Step 100). The flag FΔT2GET is not set unless two consecutive falls in the variable TQ are detected. In other words, the flag FTQU constitutes a simple noise filter. Thus, when the flag FΔT2GET is set, the maximum value among the rises in the variable TQ since the termination of the timer TOFF is substituted into the variable ΔT2.

As described above, after completion of the counting operation of the timer TOFF, the amount of fall in the torque is set in the variable ΔT1, while the amount of rise in the torque is set in the variable ΔT2. In addition, at the point of time when the variable ΔT1 is obtained, the flag FΔT1GET is set; at the point of time when the variable ΔT2 is obtained, the flag FΔT2GET is set.

[Gear-Shifting Judging Routine]

Figure 7:
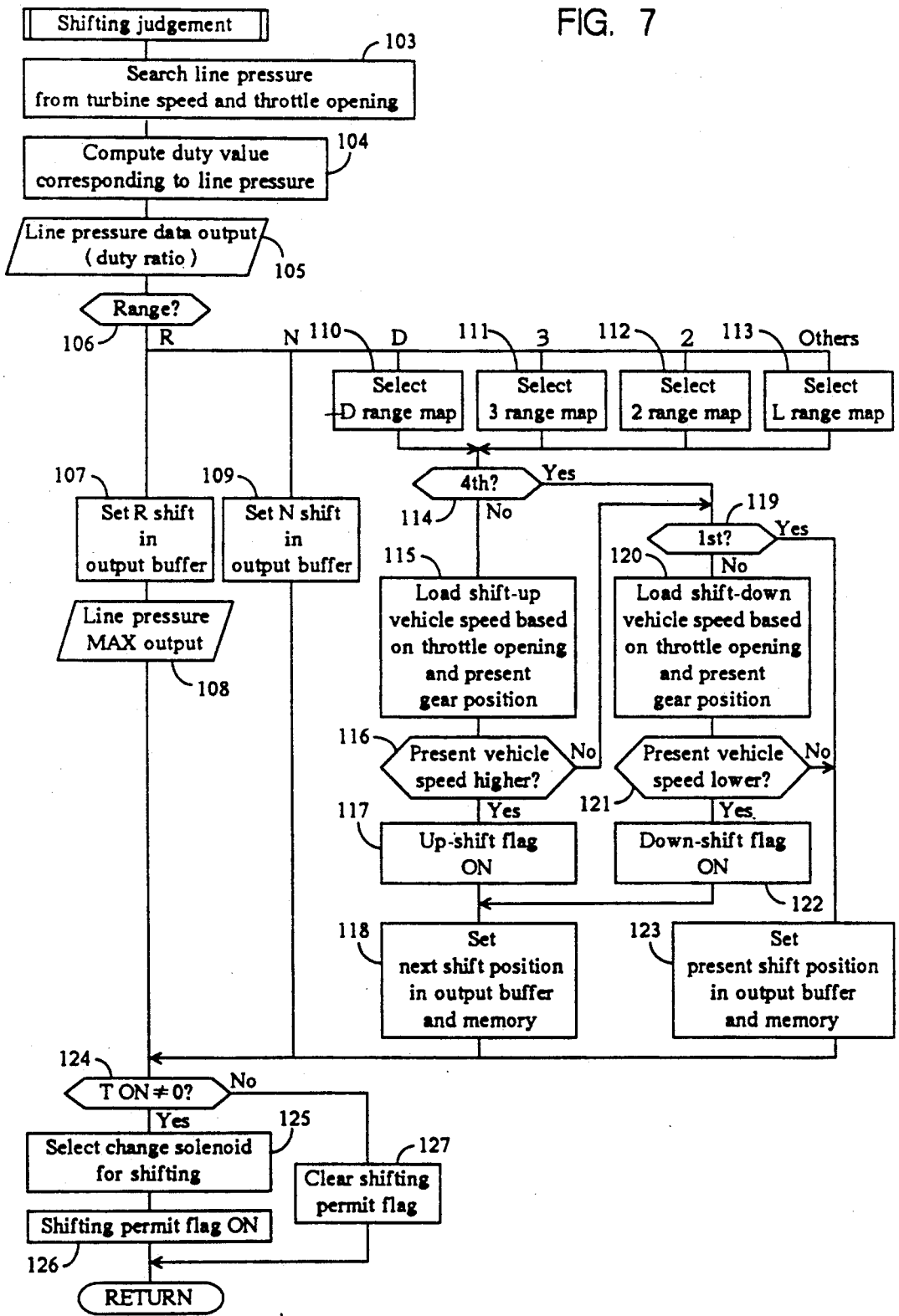

FIG. 7 is a flowchart showing the gear-shifting judging routine.

Figure 15:
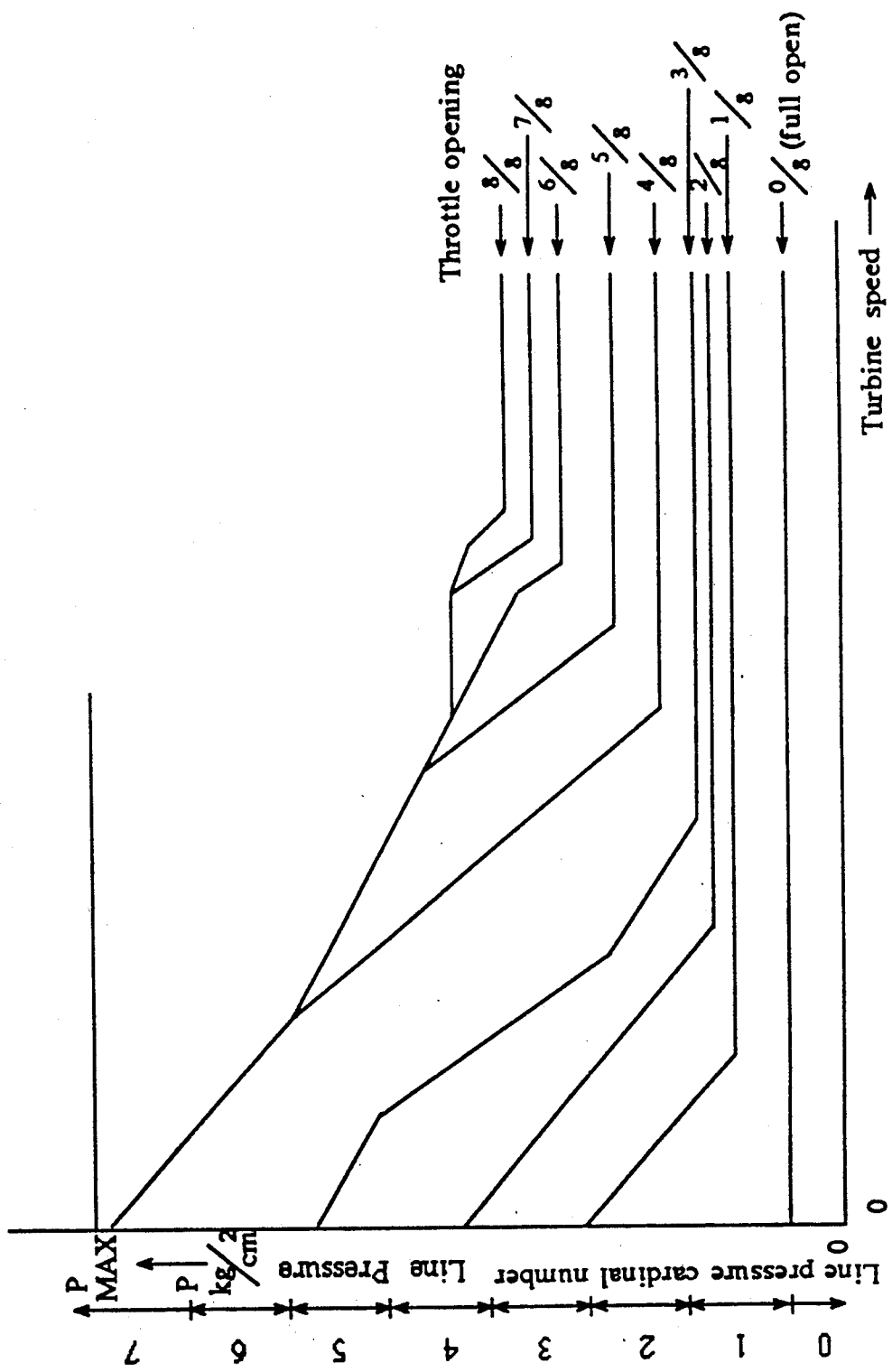

A line pressure is first obtained from the turbine speed NT and the throttle opening (Step 103). The line pressure is obtained by searching a line pressure map a part of which is shown in FIG. 14. The line pressure map shown in FIG. 14 is obtained from actually measured values. FIG. 15 is a chart showing line pressures at which excellent gear-shifting efficiency is obtained, the chart being based on actually measured values. The chart shown in FIG. 15 is converted into the line pressure map shown in FIG. 14. From the line pressure obtained in this way, a duty value for driving the line pressure control solenoid valve 48 is computed (Step 104). The duty value obtained is then outputted to drive the line pressure control solenoid valve 48 (Step 105). Thus, the line pressure is controlled to the obtained value. By controlling the line pressure in this way, the pressure used to control the power for operating the clutches and brakes of the automatic transmission can be controlled so as to obtain considerably excellent gear-shifting efficiency.

Next, selection of a range is made (Step 106). If the neutral start switch 27 is set in the R range, the R shift is set in the output buffer (Step 107), and the line-pressure control solenoid valve is duty-controlled so that the line pressures reaches its maximum value (Step 108). If the neutral start switch 27 is set in the N range, the N shift is set in the output buffer (Step 109). If the neutral start switch 27 is set in any range other than the R and N ranges, a gear-shifting map used exclusively for each individual range is selected. For example, if the neutral start switch 27 is set in the D range, the D range map is selected; if it is set in the 3 range, the 3 range map is selected. It should be noted that the 3 range map has no 3 to 4 up-shift curve, the 2 range map has neither 2 to 3 nor 3 to 4 up-shift curve, and the L range map has none of the 1 to 2, 2 to 3 and 3 to 4 up-shift curves. Thereafter, a shift position is set on the basis of the selected gear-shifting map. When the shift position presently set in the output memory is not the 4th gear and the present vehicle speed is higher than the shift-up vehicle speed obtained from the throttle opening and the gear position presently set in the output memory, the up-shift flag is set (ON) to effect shift up, and the next shift position is set in both the output buffer and the output memory (Steps 114 to 118). When the shift position presently set in the output memory is the 4th gear (O/D), or when the present vehicle speed is judged to be not higher than the shift-up vehicle speed in Step 116 and the shift position presently set in the output memory is not the 1st gear, and the present vehicle speed is lower than the shift-down vehicle speed obtained from the throttle opening and the shift position presently set in the output memory, the down-shift flag is set (ON) so as to effect shift-down, and the next shift position is set in both the output buffer and the output memory (Steps 114, 115, 116, 119 to 122 and 118). When the present vehicle speed is not higher than the shift-up vehicle speed and not lower than the shift-down vehicle speed, the present shift position is set in both the output buffer and the output memory (Step 123). It should be noted that, when the shift position presently set in the output memory is the 4th gear (0/D), judgement as to up-shift is not made. Similarly, when the shift position presently set in the output memory is the 1st gear, judgement as to down-shift is not made.

If the timer TON which is a timer for inhibiting multiple shifting during a gear-shifting operation has not yet terminated, the change solenoid valve for gear-shifting is selected, and the gear-shifting permit flag is set (ON), whereas, if the timer TON has already terminated, the gear-shifting permit flag is cleared (Steps 124 to 127). Thus, no more gear-shifting is effected in the gear-shifting judging routine during a gear-shifting operation executed when the timer TON is not running. This is to prevent delay of the gear-shifting operation when gear-shifting judgement requests occur in succession for a short period of time. Upon termination of the timer TON, the subsequent gear-shifting processing is executed from the point of time when a new gear-shifting judging request occurs even if a gear-shifting operation is being conducted. It should be noted that the timer TON is started in the gear-shifting processing executed in Step 58 shown in FIG. 4.

Upon completion of the above-described processing, the process proceeds to the main routine.

[Slope Correcting Routine]

Figure 8:
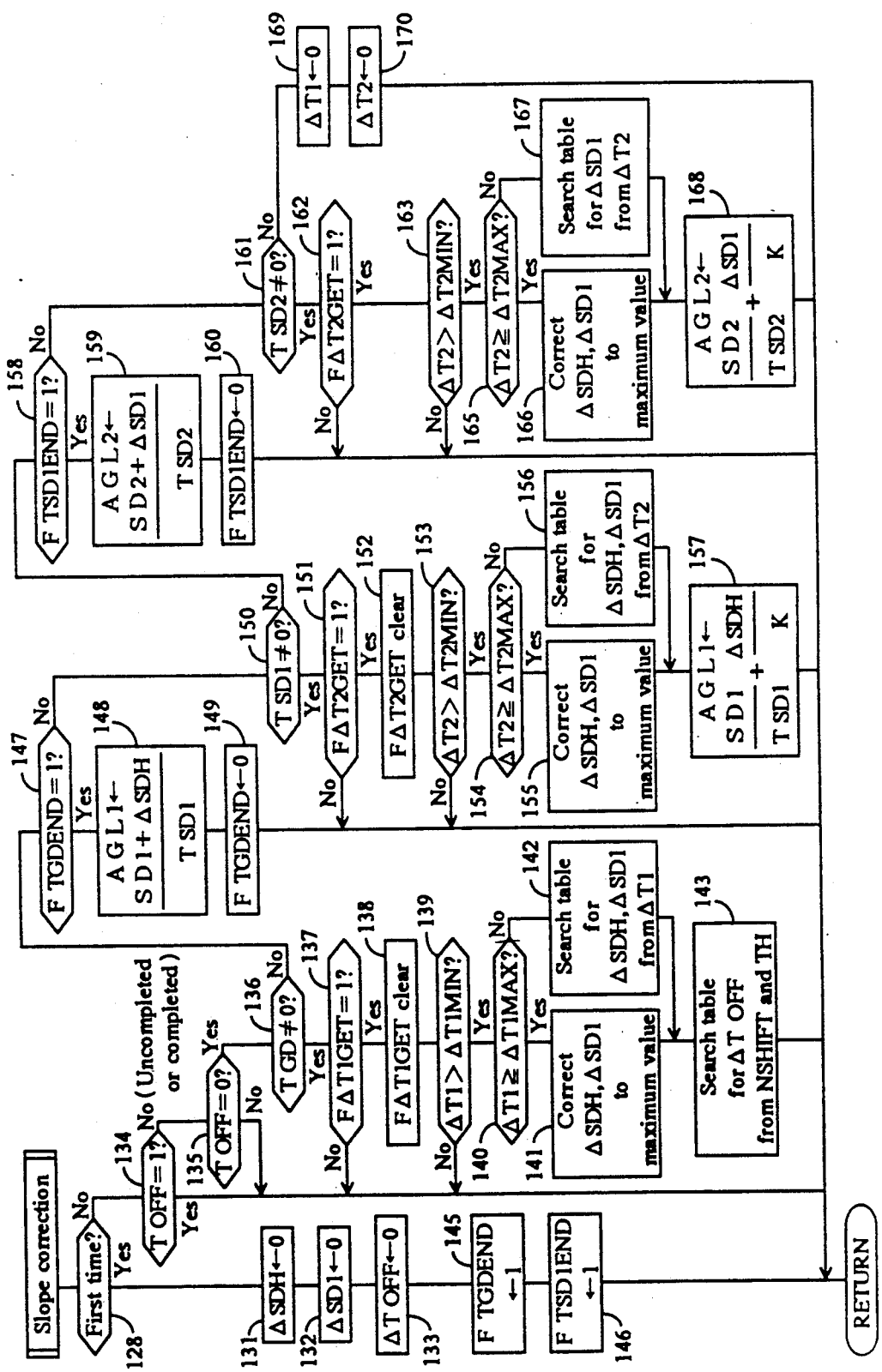

FIG. 8 is a flowchart showing the slope correcting routine.

When this routine is executed for the first time after execution of the gear-shifting judging routine, Steps 129 to 133, 145 and 146 are executed. First of all, three variables $\Delta SDH$, $\Delta SD1$ and $\Delta TOFF$ are set to 0. In addition, flags FTGDEND and FTGSDlEND which indicate termination of timers TGD and TSD1, respectively, are set to 1.

When this routine is executed for the second or further time after execution of the gear-shifting jugding routine, Step 134 and Steps which are subsequent thereto are executed. No processing is carried out until the counting operation of the timer TOFF is completed (Steps 134 and 135). Processings which are carried out after completion of the counting operation of the timer TOFF will be explained below.

When the flag F$\Delta$T1GET is set in the torque change detecting routine during execution of the counting operation of the timer TGD and the value of $\Delta T1$ obtained in the torque change detecting routine is greater than the set value $\Delta T1MIN$, variables $\Delta SDH$ and $\Delta SD1$ are set in accordance with the value of $\Delta T1$. It should be noted that, in this case, $\Delta SDH$ and $\Delta SD1$ are positive values. The engagement speed of the solenoid valve for controlling a clutch or brake which is to be engaged is changed 4 times at maximum, as described later (see FIG. 13b). In this engagement speed changing process, $\Delta SDH$ is used as a slope correction value for the first change of the engagement speed of the solenoid valve, while $\Delta SD1$ is used as a slope correction value for the second change of the engagement speed. When the value of $\Delta T1$ is not smaller than the set value $\Delta T1MAX$, each of the variables $\Delta SDH$ and $\Delta SD1$ is set to the maximum value. Thereafter, a variable $\Delta TOFF$ is searched on the basis of the present shift position and throttle opening. However, if the value of $\Delta T1$ is not obtained while the timer TGD is counting, or if the value of $\Delta T1$ is smaller than the set value $\Delta T1MIN$, the variables $\Delta SDH$ and $\Delta SD1$ are not renewed.

When the counting operation of the timer TGD is completed, a first slope AGL1 is set (Step 148). Into AGL1 is substituted $(SD1 + \Delta SDH)/TSD1$. TSD1 indicates the period of time during which the solenoid valve is duty-controlled with the slope AGL1. If the flag F$\Delta$T1GET is not set before completion of the counting operation of the timer TGD, that is, $\Delta T1$ is not obtained during the counting operation of the timer TGD, the variables ΔSDH and ΔSD1 remain 0 and the slope AGL1 is therefore SD1/TSD1.

When setting of AGL1 is completed, the flag FTGDEND is cleared, and Step 151 and Steps which are subsequent thereto are executed until the counting operation of the next timer TSD1 is completed. If the value of ΔT2 is obtained while the timer TSD1 is counting, variables ΔSDH and ΔSD1 are set in accordance with the value of ΔT2 (Steps 154 to 156). It should be noted that, when the value of ΔT2 is not smaller than the set value T2MAX, each of the variables ΔSDH and ΔSD1 is set to the maximum value. In this case, ΔSDH and ΔSD1 are negative values. At the point of time when the variables ΔSDH and ΔSD1 are set, the first slope AGL1 is renewed to (SD1/TSD1)+(ΔSDH/K) (Step 157). K is a constant, which has previously been obtained in accordance with the condition of the vehicle. As the value of K is increased, the degree to which correction is made decreases. It is therefore preferable to adjust it properly in conformity with the vehicle. When the value of ΔT2 is not obtained while the timer TSD1 is counting, or when the value of ΔT2 is smaller than the set value ΔT2MIN, the variables ΔSDH and SD1 are not renewed.

When the counting operation of the timer TSD1 is completed, a second slope AGL2 is set (Step 159). Into AGL2 is substituted (SD2+ΔSD1)/TSD2. TSD2 indicates the period of time during which the solenoid valve is duty-controlled with the slope AGL2. It should be noted that, if ΔT2 is not obtained while the timer TSD1 is counting, the variables ΔSDH and ΔSD1 renewed during the counting operation of the timer TGD are used. If ΔT1 is not obtained while the timer TGD is counting, the variables ΔSDH and ΔSD1 remain 0, as a matter of course, and the slope AGL2 is therefore SD2/TSD2.

When setting of AGL2 is completed, the flag FTSD1END is cleared, and Step 161 and Steps which are subsequent thereto are executed until the counting operation of the next timer TSD2 is completed. If the value of ΔT2 is obtained during the counting operation of the timer TSD2, variables ΔSDH and ΔSD1 are set in accordance with the value of ΔT2 (Steps 165 to 167). It should be noted that, if the value of ΔT2 is not smaller than the set value ΔT2MAX, each of the variables ΔSDH and ΔSD1 is set to the maximum value. In this case, ΔSDH and ΔSD1 are negative values. At the point of time when the variables ΔSDH and ΔSD1 are set, the second slope AGL2 is renewed to (SD2/TSD2)+(ΔSD1/K) (Step 157). If the value of ΔT2 is not obtained during the counting operation of the timer TSD2, or if the value of ΔT2 is smaller than the set value ΔT2MIN, the variables ΔSDH and ΔSD1 are not renewed.

When the counting operation of the timer TSD2 is completed, ΔT1 and ΔT2 are cleared, and this state is held until the next gear-shifting operation is conducted. Thus, the values of the slopes AGL1 and AGL2 are set and corrected while the counting operations of the timers TOFF, TGD, TSD1 and TSD2 are executed and completed after the gear-shifting judging routine.

Figure 9:
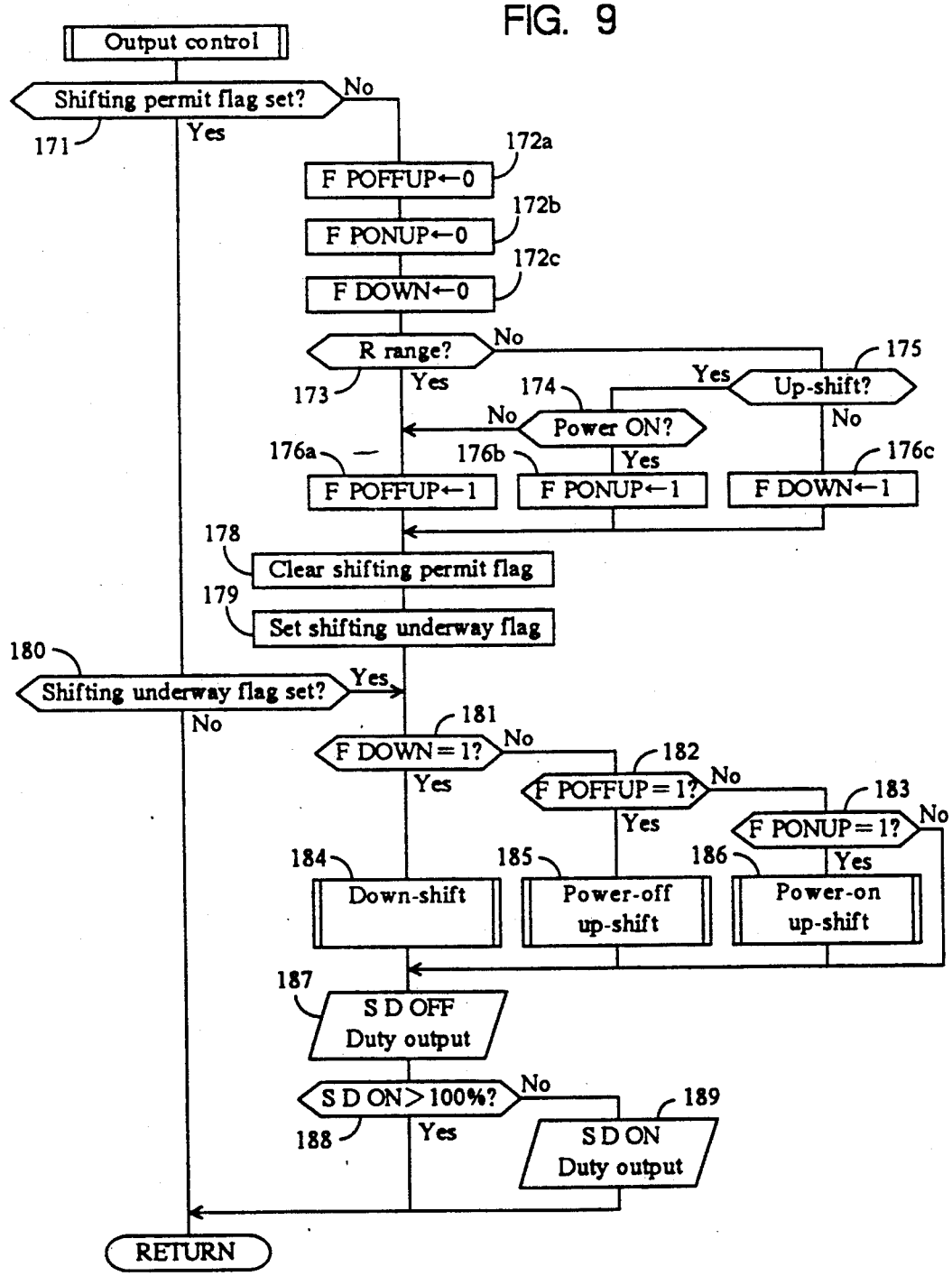

[Output Control Routine]
FIG. 9 is a flowchart showing the output control routine.

If the gear-shifting permit flag has been set, flags are set in accordance with the shift condition. Thereafter, the gear-shifting permit flag is cleared and a gear-shifting underway flag is set (Steps 171 to 179). Setting of the flags is carried out as follows. In the case of the R range and power-off up-shift, the flag FPOFFUP for power-off up-shift is set; in the case of power-on up-shift, the flag FPONUP for power-on up-shift is set; and in the case of down-shift, the flag FDOWN for down-shift is set.

After this processing, or if the gear-shifting underway flag has been set, it is judged whether the gear-shifting that is being effected is down-shift, power-on up-shift or power-off up-shift by referring to the flag, and the subroutine of down-shift processing (Step 184), power-off up-shift processing (Step 185) or power-on up-shift processing (Step 186) is executed in accordance with the result of the judgement. Then, each solenoid valve is duty-controlled in accordance with the engagement ratio therefor obtained in the corresponding subroutine (Steps 187 to 189). It should be noted that, if the obtained duty ratio for the solenoid valve for controlling a clutch or brake which is to be engaged is in excess of 100%, the output is left unchanged.

Figure 10:
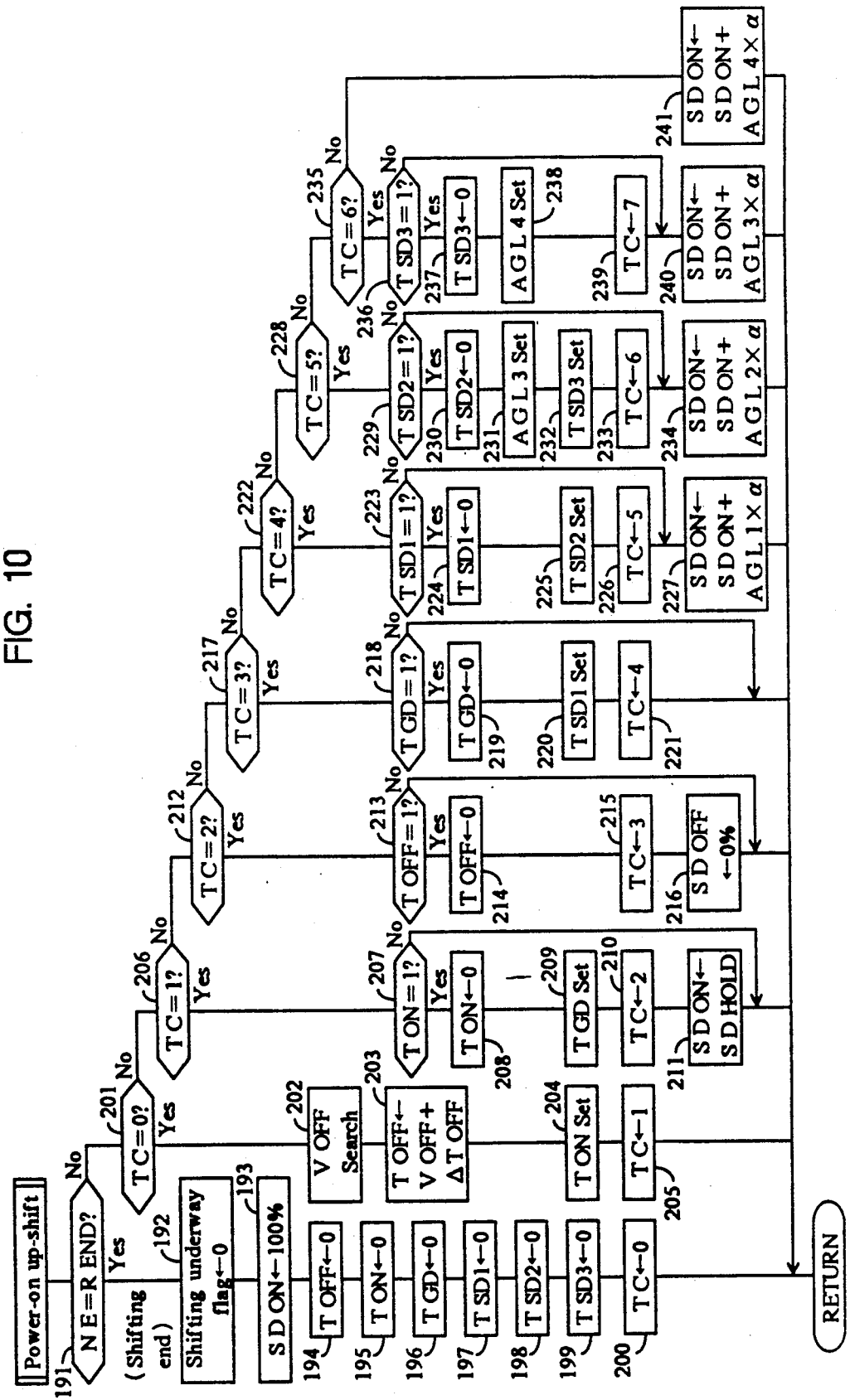
FIGS. 10, 11 and 12 are flowcharts respectively showing in detail the power-on up-shift routine, power-off up-shift routine and down-shift routine shown in FIG. 9.

[Power-On Up-Shift Routine]
FIG. 10 is a flowchart showing the power-on up-shift routine.

If it is judged in the gear-shifting judging routine that it is possible to effect gear-shifting and if the present shift position is power-on up-shift, this routine is executed. The termination of gear-shifting is judged on the basis of the estimated engine speed REND which is expected to be reached by the engine speed NE at the end of a gear-shifting operation. When the engine speed NE reaches REND, Step 192 and Steps which are subsequent thereto are executed. During a gear-shifting operation, processing is carried out in accordance with the value of the timer counter TC. Each value of the timer counter TC is assigned to each piece of information as follows: the value 1 indicates that the timer TON is executing a counting operation; the value 2 indicates that the timer TOFF is executing a counting operation; the value 3 indicates that the timer TGD is executing a counting operation; the value 4 indicates that the timer TSD1 is executing a counting operation; the value 5 indicates that the timer TSD2 is executing a counting operation; the value 6 indicates that the timer TSD3 is executing a counting operation; and the value 7 indicates that the counting operation of the timer TSD3 has already been completed. It should be noted that, if a gear-shifting operation is judged to be completed, gear-shifting end processing is carried out irrespective of the value of the timer counter TC.

(1) Gear-Shifting End Processing
When the engine speed NE reaches the estimated engine speed REND which is expected to be reached by the engine speed NE at the end of a gear-shifting operation, the gear-shifting end processing is carried out. At this time, the gear-shifting underway flag is cleared, and the engagement ratio for the solenoid valve for controlling a clutch or brake which is to be engaged is set to 100%. Next, the counting operations of all the timers TOFF, TON, TGD, TSD1, TSD2 and TSD3 for gear-shifting are forcibly completed and the timer counter TC is set to 0 to make preparations for the next gear-shifting operation. Since the gear-shifting underway flag is cleared, this routine is not executed until the next gear-shifting judging processing is executed. At the time of starting the next gear-shifting operation, this routine starts with the timer counter TC set to 0.

(2) At Start of Gear-Shifting (TC=0)

Since the timer counter TC is set to 0 in the gear-shifting end processing and hence TC=0 after the end of a gear-shifting operation, Steps 202 to 205 are executed at the start of the next gear-shifting operation. In these Steps, a value VOFF which is to be set in the timer TOFF is searched, and after the correction value ΔTOFF is added to the obtained value VOFF, the timer TOFF is started. TOFF is a value obtained in the above-described slope correcting routine. At the same time, the timer TON is also started. Thereafter, the timer counter TC is set to 1.

(3) During Execution of Timer TON (TC=1)

When the timer counter TC is set to 1 (TC=1), this state is held until the counting operation of the timer TON terminates (TON=1). When the timer TON terminates, the operation of the timer TON is completed (TON←0), and the timer TGD is set and started instead. Thereafter, the timer TGD is decremented by one every time the interrupt routine is executed. Then, the timer counter TC is set to 2, and the duty ratio of the solenoid valve for controlling a clutch or brake which is to be engaged is set to SDHOLD%. The value SDHOLD is a duty ratio of the solenoid valve which corresponds to the highest pressure value at which the associated clutch or brake is not activated. Thus, by setting the duty ratio of the solenoid valve to the value SDHOLD%, the start of operation of the clutch or brake can be hastened.

(4) During Execution of Timer TOF (TC=2)

When the timer counter TC is set to 2 (TC=2), this state is held until the timer TOFF terminates (TOFF=1). When the timer TOFF terminates, the operation of the timer TOFF is completed (TOFF←0). Then, the timer counter TC is set to 3, and the duty ratio of the solenoid valve for controlling a clutch or brake which is to be released is set to 0%, thereby releasing the clutch or brake which is to be released.

(5) During Execution of Timer TGD (TC=3)

When the timer counter TC is set to 3 (TC=3), this state is held until the timer TGD terminates (TGD=1). When the timer TGD terminates, the operation of the timer TGD is completed (TGD←0). Then, the timer TSD1 is set and started, and the timer counter TC is set to 4.

(6) During Execution of Timer TSD1 (TC=4)

Figure 13A:
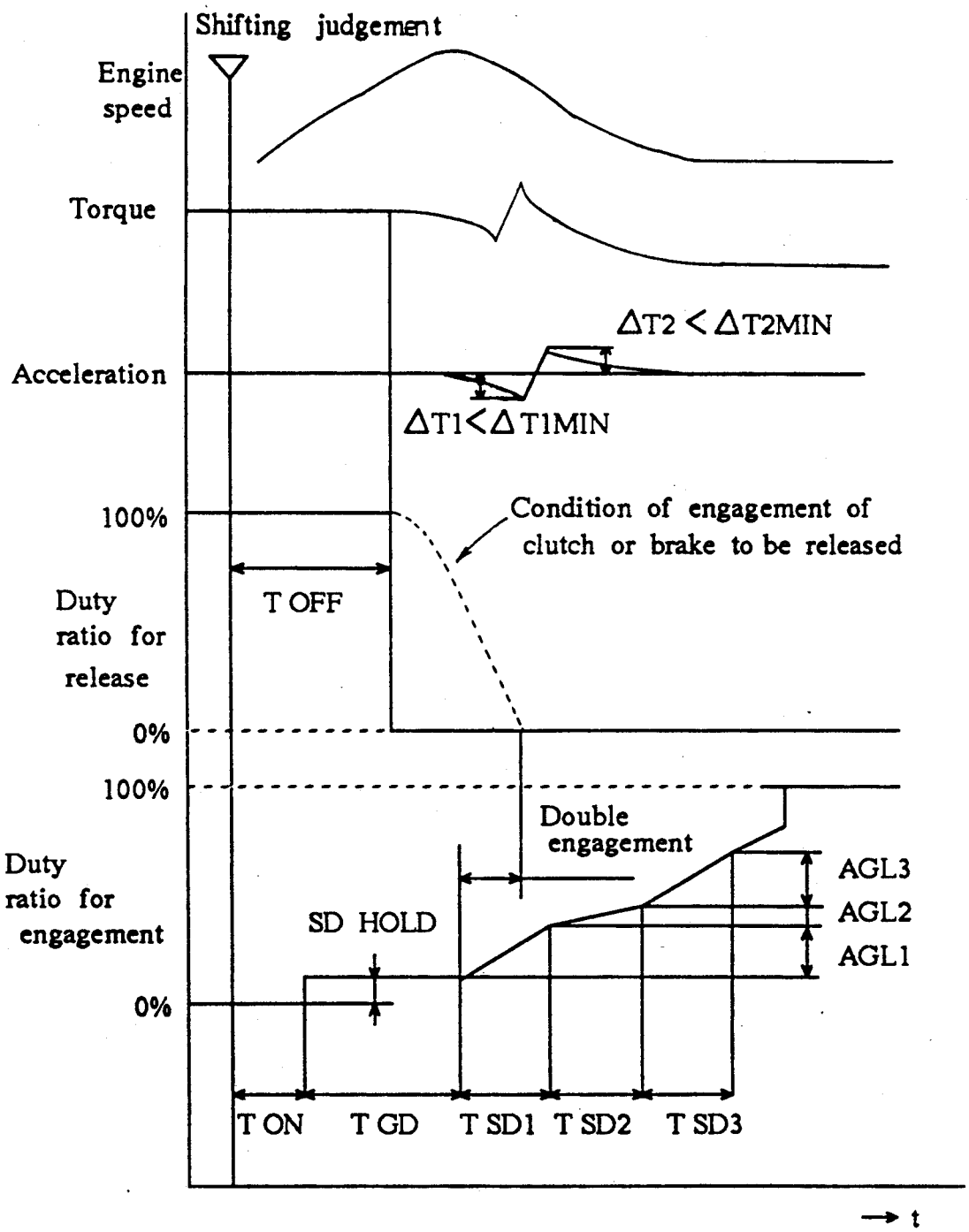
FIGS. 13a, 13b, 13c, 13d and 13e are time charts showing the condition of engagement of a clutch or a brake during a gear-shifting operation in each of the various conditions.

When the timer counter TC is set to 4 (TC=4), the duty ratio SDON of the solenoid valve for controlling a clutch or brake which is to be engaged is gradually increased by the value AGL1×α until the timer TSD1 terminates (TSD1=1). α is a coefficient which is set so that the slope of the engagement pressure curve at the point of time when TC=3 is coincident with AGL1. Accordingly, during the execution of the timer TSD1, the engagement pressure applied to a clutch or brake which is to be engaged increases with the slope AGL1 as time goes by, as shown in FIG. 13a. It should be noted that AGL1 has been set upon completion of the counting operation of the timer TSD in the slope correcting processing shown in FIG. 8 (Step 148). Even during the execution of the timer TSD1, AGL1 may be corrected in the slope correcting processing shown in FIG. 8 (Step 157). When the timer TSD1 terminates, the operation of the timer TSD1 is completed (TSD1←0), and the timer TSD2 is set and started. Then, the timer counter TC is set to 5.

(7) During Execution of Timer TSD2 (TC=5)

When the timer counter TC is set to 5 (TC=5), the duty ratio SDON of the solenoid valve for controlling a clutch or brake which is to be engaged is gradually increased by the value AGL2×α until the timer TSD2 terminates (TSD2=1). α is a coefficient which is similar to that employed during the execution of the timer TSD1. Accordingly, during the execution of the timer TSD2, the engagement pressure applied to a clutch or brake which is to be engaged increases with the slope AGL2 as time goes by. It should be noted that AGL2 has been set upon completion of the operation of the timer TSD1 in the slope correcting processing shown in FIG. 8 (Step 159). Even during the execution of the timer TSD2, AGL2 may be corrected in the slope correcting processing shown in FIG. 8 (Step 168). When the timer TSD2 terminates, the operation of the timer TSD2 is completed (TSD2←0), and the timer TSD3 is set and started. Then, the timer counter TC is set to 6.

(8) During Execution of Timer TSD3 (TC=6)

When the timer counter TC is set to 6 (TC=6), the duty ratio SDON of the solenoid valve for controlling a clutch or brake which is to be engaged is gradually increased by the value AGL3×α until the timer TSD3 terminates (TSD3=1). α is a coefficient which is similar to that employed during the execution of the timer TSD1. Accordingly, during the execution of the timer TSD3, the engagement pressure applied to a clutch or brake which is to be engaged increases with the slope AGL3 as time goes by. It should be noted that, unlike AGL1 and AGL2, AGL3 has previously been set in accordance with the type of vehicle. When the timer TSD3 terminates, the operation of the timer TSD3 is completed (TSD3←0). Then, the timer counter TC is set to 7.

(9) After Completion of Timer TSD3 (TC=7)

When the timer TC is set to 7 (TC=7), the duty ratio SDON of the solenoid valve for controlling a clutch or brake which is to be engaged is gradually increased by the value AGL4×α. α is a coefficient which is similar to that employed during the execution of the timer TSD1. Thereafter, the engagement pressure applied to a clutch or brake which is to be engaged increases with the slope AGL4 as time goes by. However, when SDON exceeds 100%, the output is suspended by the processing carried out in Step 189 shown in FIG. 9. It should be noted that AGL4 is a value which has previously been set in accordance with the type of vehicle in the same way as in the case of AGL3. This state is continued until the conditions of the end of gear-shifting are satisfied.

[Power-Off Up-Shift Routine, Down-Shift Routine]

Figure 11:
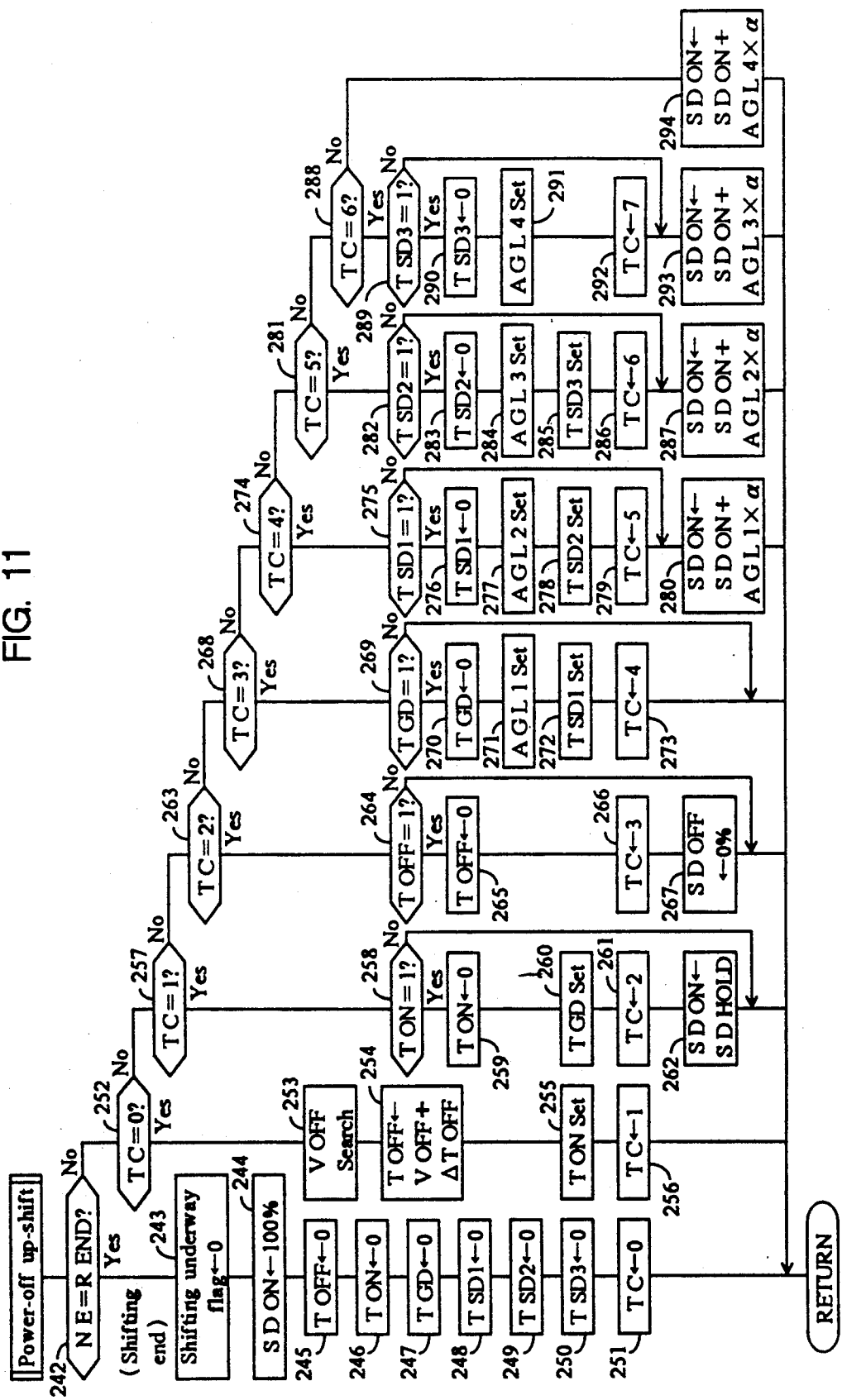
Figure 12:
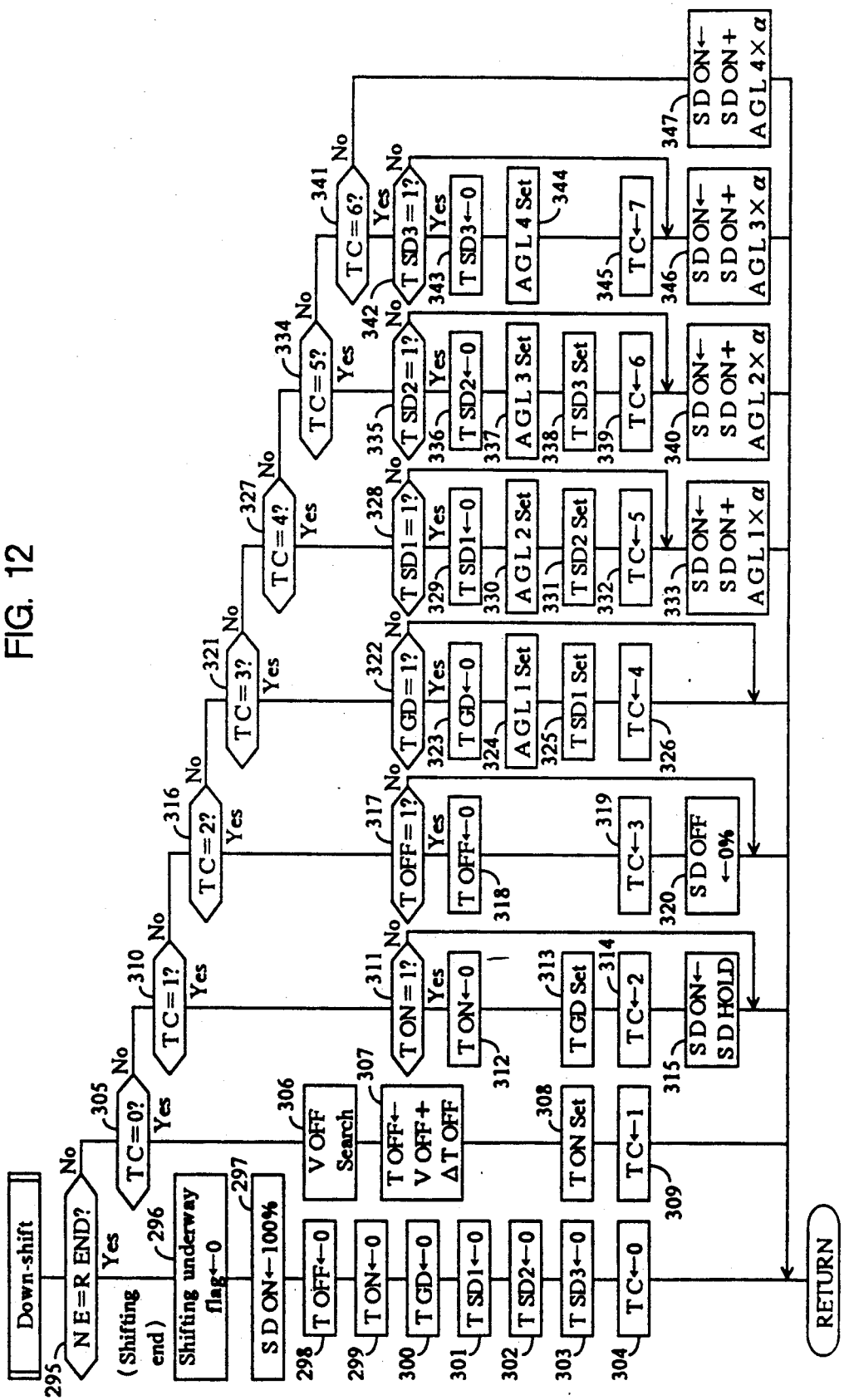

FIG. 11 is a flowchart showing the power-off up-shift routine, and FIG. 12 is a flowchart showing the down-shift routine.

In the power-off up-shift routine and down-shift routine, substantially the same processing as in the case of the power-on up-shift routine is carried out. However, it is considered that, in many of the cases where power-off up-shift or down-shift other than kick-down shift is effected, the accelerator is not stepped on and a sudden change in torque is therefore unlikely to occur. Accordingly, correction of the slopes AGL1 and AGL2 is not made in these processings. The slope AGL1 is set immediately before the timer TC is set to 3, while the slope AGL2 is set immediately before the timer TC is set to 4. In this embodiment, factors which are different in each shift, other than that described above, are restricted to only the initial values for the timers TOFF, TON, TGD, TSD1, TSD2 and TSD3 and the set values for the slopes AGL1, AGL2, AGL3 and AGL4, for the purpose of simplification. It is, however, possible to add, for example, processing of timer correction which may be made in accordance with a change in the engine speed.

[Operation of Solenoid Valves during Power-On Up-Shift]

The operation of solenoid valves during power-on up-shift will next be explained with reference to FIGS. 13a to 3e.

(1) When torque change is small (no correction is made: FIG. 13a)

When $\Delta T1$ and $\Delta T2$ are small or not obtained, no correction of slope is made. Referring to FIG. 13a, when the time TOFF has elapsed after gear-shifting judgement, the solenoid valve for controlling a clutch or brake which is to be released is released. When the time TON has elapsed after gear-shifting judgement, the duty ratio of the solenoid valve for controlling a clutch or brake which is to be engaged is set to SDHOLD%, thereby setting the oil pressure applied to the clutch or brake which is to be engaged to a level immediately below the oil pressure at which the clutch or brake to be engaged is activated, and thus making preparations for engagement of the clutch or brake to be engaged. When the time TGD has elapsed after termination of the timer TON, the duty ratio of the solenoid valve for controlling the clutch or brake to be engaged begins to increase gradually, so that the clutch or brake to be engaged begins to be engaged. Even if the solenoid valve for controlling the clutch or brake to be released is released at this time, disengagement of the clutch or brake to be released is delayed by the delay in the supply of oil pressure in actuality. Accordingly, at the point of time when the clutch or brake to be engaged begins to be engaged, double engagement occurs. This double engagement is effectively controlled by controlling the rate of increase of the duty ratio of the solenoid valve for the clutch or brake to be engaged, thereby minimizing the shock applied to the vehicle during the gear-shifting operation. The duty ratio of the solenoid valve for the clutch or brake to be engaged is controlled such that the slopes AGL1, AGL2, AGL3 and AGL4 are successively changed over from one to another in the mentioned order. When the engine speed reaches the value REND which is expected to be reached by the engine speed after gear-shifting, the duty ratio of the solenoid valve for the clutch or brake to be engaged is set to 100%, thereby completely locking the clutch or brake, and thus completing the gear-shifting operation.

Figure 13B:
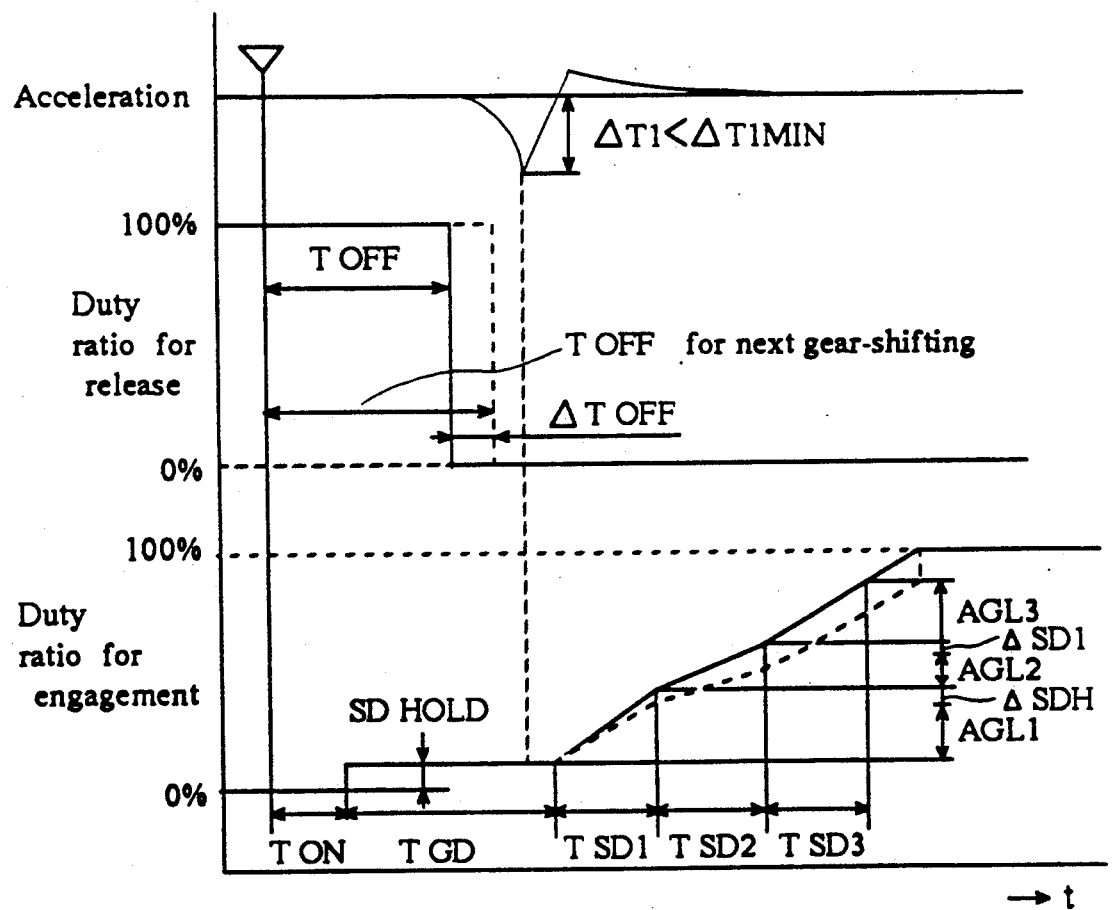

(2) When $\Delta T1$ is obtained during TGD (FIG. 13b)

If the time interval between the termination of the timer TOFF and the termination of the timer TGD is excessively long, the clutch or brake which is to be released is undesirably completely released before the clutch or brake which is to be engaged begins being engaged. In such a case, the vehicle falls into a neutral state and the engine driving torque transmitted to the wheels is cut off. In consequence, the torque of the rotating output shaft suddenly falls and approaches 0. Thereafter, engagement of the clutch or brake to be engaged is effected, and the torque of the rotating output shaft temporarily increases and then becomes stationary. Accordingly, the output of the acceleration sensor has a peak in the negative direction due to the generation of deceleration during the neutral condition of the vehicle. As a result, $\Delta T1$ is obtained. The fact that $\Delta T1$ is obtained means that the time interval between the release of the clutch or brake to be released and the engagement of the clutch or brake to be engaged is excessively long. Accordingly, in this embodiment, the time of the timer TOFF is extended by $\Delta TOFF$ in the subsequent gear-shifting operation, thereby shortening the time interval between the release of the clutch or brake to be released and the engagement of the clutch or brake to be engaged. In addition, AGL1 is increased by $\Delta SDH$ and AGL2 is increased by $\Delta SD1$, thereby increasing the speed of engagement of the clutch or brake to be engaged, and thus shortening the period of time during which a neutral state may occur. In this way, $\Delta T1$ is reduced to minimize the shock applied to the vehicle during a gear-shifting operation.

Figure 13C:
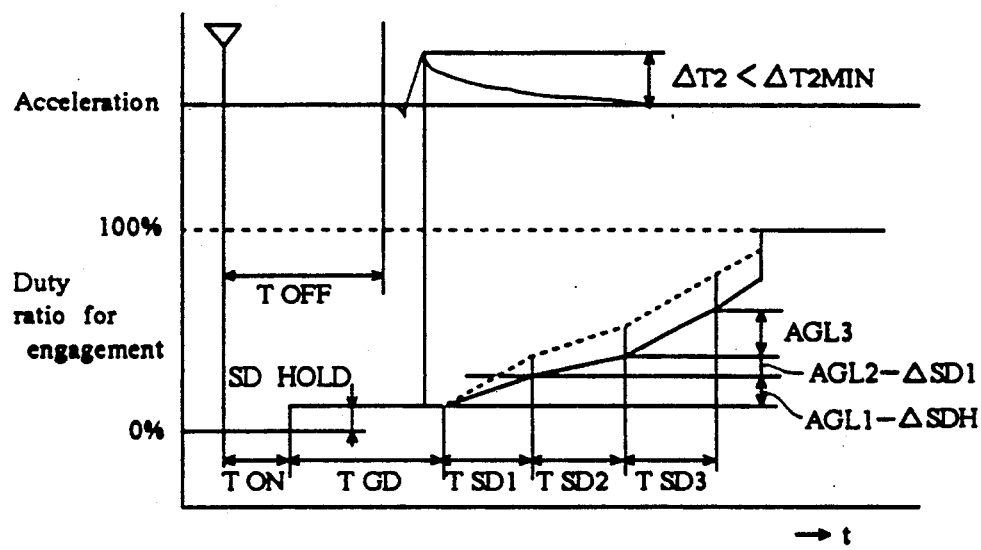

(3) When $\Delta T2$ is obtained during TGD (FIG. 13c)

When the timer TON terminates, the duty ratio of the solenoid valve for the clutch or brake to be engaged is raised to SDHOLD%. SDHOLD has previously been set to a value at which neither clutch nor brake is activated. There is, however, a fear that the clutch or brake may begin to be activated due to, for example, variations in manufacture of equipment or variations in the oil pressure. In such a case, the torque which temporarily lowers due to the release of the clutch or brake to be released begins to rise due to the engagement of the clutch or brake to be engaged. The torque thus raised gradually decreases as the release of the clutch or brake to be released progresses. At this time, $\Delta T2$ is obtained. The fact that $\Delta T2$ is obtained means that engagement of the clutch or brake to be engaged is effected too quickly, and the speed of engagement of the solenoid for the clutch or brake to be engaged is therefore lowered. Thus, the correction values $\Delta SDH$ and $\Delta SD1$ for the slopes AGL1 and AGL2 are set to negative values, which are then added to the slopes AGL1 and AGL2, respectively. Accordingly, the speed of engagement of the clutch or brake to be engaged is reduced to an appropriate value, thus the shock being reduced.

Figure 13D:
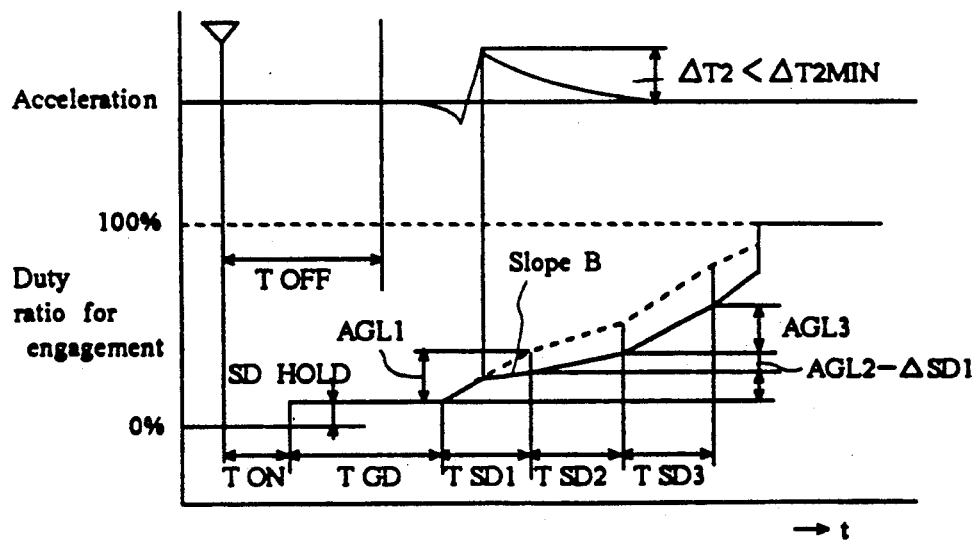

(4) When $\Delta T2$ is obtained during TSD1 (FIG. 13d)

If the speed of engagement of the clutch or brake which is to be engaged is excessively high, the torque which begins to lower due to release of the clutch or brake to be released suddenly rises for a moment. Accordingly, instantaneous acceleration occurs and $\Delta T2$ is thus obtained. When $\Delta T2$ is obtained during TSD1, the engagement speed of the solenoid valve for the clutch or brake to be engaged after the point of time when $\Delta T2$ is obtained is lowered. First of all, during TSD1 the slope $\beta$ employed after the point of time when $\Delta T2$ is obtained is set to $(SD1/TSD1+\Delta SDH/K)$. Since $\Delta SDH$ is set to a negative value, the slope $\beta$ is smaller than the slope AGL1. Further, the value $\Delta SD1$ which is set to a negative value is applied to the slope AGL2 employed during the execution of the timer TSD2. The slope during the execution of the timer TSD2 is therefore also smaller than in the normal case. Accordingly, it is possible to suppress a sudden rise in the torque.

Figure 13E:
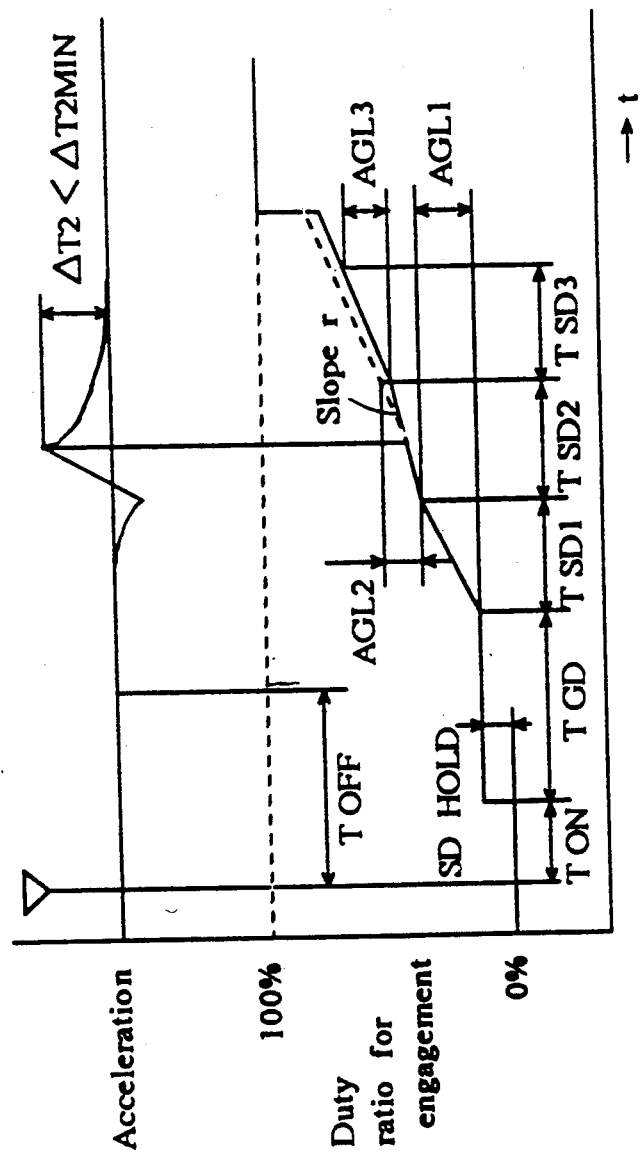

(5) When $\Delta T2$ is obtained during TSD2 (FIG. 13e)

In the same way as in the case where $\Delta Ts$ is obtained during TSD1, if $\Delta T2$ is obtained during TSD2, the speed of engagement of the clutch or brake which is to be engaged is revealed to be excessively high; therefore, the engagement speed of the solenoid valve for the clutch or brake to be engaged after the point of time when $\Delta T2$ is obtained is lowered. The slope $\gamma$ employed during TSD2 after the point of time when $\Delta T2$ is obtained is set to $(SD2/TSD2+\Delta SD1/K)$. Since $\Delta SD1$ is set to a negative value, the slope γ is smaller than the slope AGL2.

Thus, if ΔT1 is obtained, the speed of engagement of the clutch of brake to be engaged is increased, whereas, if ΔT2 is obtained, the speed of engagement of the clutch or brake to be engaged is reduced, thereby minimizing the shock.

Although in this embodiment slope correction is made only once during a gear-shifting operation, it may also be made for the processings subsequent thereto.

As has been described above, the present invention has the torque detecting means (the acceleration sensor 36 and the torque change detecting routine: Steps 81 to 101) for detecting the torque of the output shaft of the automatic transmission and the engagement speed correcting means (the slope correcting routine: Steps 128 to 179) for correcting the speed (AGL1, AGL2) of engagement of a clutch or brake which is to be engaged on the basis of the detected torque. Accordingly, if the condition of double engagement is judged to be improper in the process of gear-shifting, the speed of engagement of the clutch or brake to be engaged is automatically corrected so that the condition of double engagement is shifted to an optimal one by feedback control. Thus, the shock applied to the vehicle during a gear-shifting operation is reduced and the feeling during running is improved.

By using the acceleration detecting means to detect also the level of torque, it becomes unnecessary to provide a torque sensor which would otherwise be needed to measure the torque of the output shaft of the automatic transmission and it is therefore possible to carry out the present invention without the need to change the overall size of the automatic transmission system.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An electrically controlled automatic transmission system for a vehicle, comprising:
    an automatic transmission having an output shaft, and a plurality of clutches and brakes activated by application of a fluid pressure to change a gear ratio by engagement and disengagement of said clutches and brakes;
    a plurality of control valves for the clutches and brakes, respectively, each of said control valves individually controlling one of said clutches and brakes;
    means for detecting a running condition of the vehicle; and
    electronic control means for determining the engagement and disengagement of said clutches and brakes in accordance with the detected running condition of the vehicle, and for controlling said control valves in accordance with the determined engagement and disengagement, said electronic control means also individually determining a speed of engagement for those clutches and brakes which are to be engaged, and for controlling said control valves to change the fluid pressure in accordance with the determined speed of engagement, thereby individually controlling the speed of engagement of said clutches and brakes;
    said electronic control means including:
    torque detecting means for detecting a torque of the output shaft of said automatic transmission; and
    engagement speed correcting means for correcting the determined speed of engagement according to the detected torque.

2. The electrically controlled automatic transmission system according to claim 1 wherein said torque detecting means detects the output shaft torque from an acceleration of the vehicle.

3. The electrically controlled automatic transmission system according to claim 1, wherein said electronic control means changes said speed of engagement by changing an amount of the fluid pressure over time.

4. The electrically controlled automatic transmission system according to claim 3 wherein said electronic control means determines an amount of the fluid pressure per time according to a variation of the detected torque while the gear ratio is changing.

5. The electrically controlled automatic transmission system according to claim 4 wherein said electronic control means increases the speed of engagement if the detected torque decreases at a rate which is faster than a predetermined slope after said clutches and brakes are disengaged.

6. The electrically controlled automatic transmission system according to claim 4 wherein said electronic control means decreases the speed of engagement if the detected torque increases at a rate which is larger than a predetermined slope after said clutches and brakes are disengaged.

7. The electronically controlled automatic transmission system according to claim 4 wherein said electronic control means decreases the speed of engagement when the detected torque increases at a rate which is larger than a predetermined slope while the clutches and brake are engaging.

8. The electronically controlled automatic transmission system according to claim 1 wherein said electronic control means operates in accordance with the corrected speed of engagement of a subsequent gear change.

* * * * *